(12) United States Patent
Katoh

(10) Patent No.: US 8,991,477 B2
(45) Date of Patent: Mar. 31, 2015

(54) REFRIGERANT RADIATOR

(75) Inventor: Yoshiki Katoh, Chita-gun (JP)

(73) Assignee: Denso Corporation, Kariya (JP)

( * ) Notice: Subject to any disclaimer, the term of this patent is extended or adjusted under 35 U.S.C. 154(b) by 490 days.

(21) Appl. No.: 13/343,954

(22) Filed: Jan. 5, 2012

(65) Prior Publication Data

US 2012/0175081 A1 Jul. 12, 2012

(30) Foreign Application Priority Data

Jan. 7, 2011 (JP) ................................ 2011-001922

(51) Int. Cl.
| | | |
|---|---|---|
| B60H 3/00 | (2006.01) | |
| B60H 1/00 | (2006.01) | |
| F25B 39/04 | (2006.01) | |
| F28D 1/053 | (2006.01) | |
| F25B 9/00 | (2006.01) | |
| F28D 1/02 | (2006.01) | |

(52) U.S. Cl.
CPC ........ B60H 1/00064 (2013.01); B60H 1/00335 (2013.01); B60H 1/00921 (2013.01); F25B 9/008 (2013.01); F25B 39/04 (2013.01); F25B 2309/061 (2013.01); F28D 2001/0266 (2013.01); F28D 1/05366 (2013.01); F28D 1/05391 (2013.01)
USPC ................. 165/42; 165/41; 165/202; 165/203

(58) Field of Classification Search
CPC .................................................. B60H 1/00064
USPC ...................................... 165/41, 42, 202, 174
See application file for complete search history.

(56) References Cited

U.S. PATENT DOCUMENTS

| | | | | |
|---|---|---|---|---|
| 5,309,731 | A | * | 5/1994 | Nonoyama et al. .............. 62/244 |
| 5,927,382 | A | * | 7/1999 | Kokubo ........................... 165/42 |
| 6,371,202 | B1 | * | 4/2002 | Takano et al. ................... 165/202 |

(Continued)

FOREIGN PATENT DOCUMENTS

| | | |
|---|---|---|
| JP | 06-144163 | 5/1994 |
| JP | 10-181331 | 7/1998 |

(Continued)

OTHER PUBLICATIONS

Office action dated Jan. 7, 2014 in corresponding Japanese Application No. 2011-276012.
Office Action dated Apr. 16, 2014 in the corresponding CN application No. 201210003465.3 with English translation.
Office Action mailed Aug. 26, 2014 in corresponding JP Application No. 2011-276012 with English translation.

Primary Examiner — Marc Norman
Assistant Examiner — Devon Russell
(74) Attorney, Agent, or Firm — Harness, Dickey & Pierce, PLC

(57) ABSTRACT

A refrigerant radiator used for a vapor compression refrigerant cycle including a compressor configured to compress and discharge refrigerant includes tubes through which the refrigerant flows. The tubes are stacked and arranged in a horizontal direction, and extend in a direction perpendicular to the horizontal direction or with an angle from the horizontal direction. The tubes include a first heat exchange area where refrigerant having a temperature equal to or higher than a standard temperature exchanges heat with first air blown to a space, and a second heat exchange area where refrigerant having a temperature lower than the standard temperature exchanges heat with second air blown to the space. Generally, the second air has a temperature different from a temperature of the first air.

22 Claims, 8 Drawing Sheets

HEATING OPERATION

(56) References Cited

U.S. PATENT DOCUMENTS

| | | | |
|---|---|---|---|
| 6,601,639 B2* | 8/2003 | Shibata | 165/42 |
| 7,040,385 B2* | 5/2006 | Higashiyama | 165/153 |
| 8,443,873 B2* | 5/2013 | Nanaumi et al. | 165/202 |
| 2003/0062152 A1* | 4/2003 | Kuroda et al. | 165/202 |
| 2004/0069441 A1* | 4/2004 | Burgers et al. | 165/41 |
| 2009/0120627 A1* | 5/2009 | Beamer et al. | 165/174 |
| 2009/0166017 A1* | 7/2009 | Katoh | 165/153 |

FOREIGN PATENT DOCUMENTS

| | | |
|---|---|---|
| JP | 2001-099522 | 4/2001 |
| JP | 2004-125346 | 4/2004 |
| JP | 2004-347158 | 12/2004 |

* cited by examiner

HEATING OPERATION

COOLING OPERATION

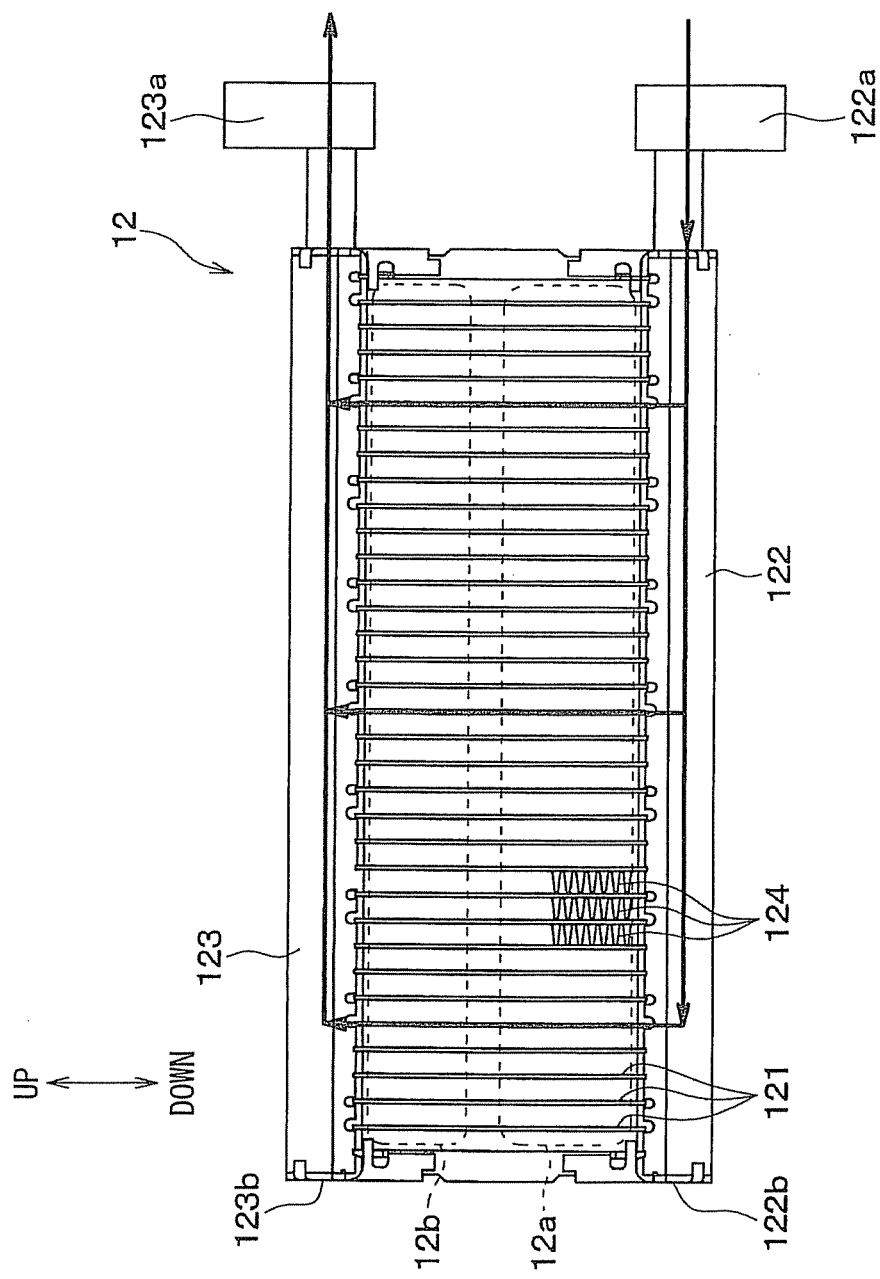
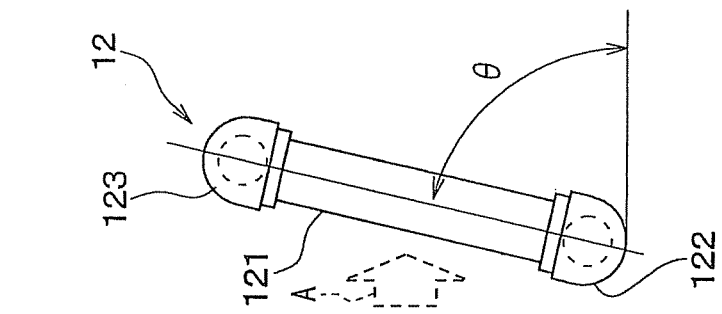

FIG. 5

| MEASUREMENT CONDITION | (a) Va = 434 m³/h<br>Gr = 77.9 m³/h<br>SH = 45.8 °C<br>SC = 4.9 °C<br>Tain = 10.1 °C | (b) Va = 386 m³/h<br>Gr = 56.4 m³/h<br>SH = 46.1 °C<br>SC = 6.3 °C<br>Tain = 20.1 °C | (c) Va = 200 m³/h<br>Gr = 40.2 m³/h<br>SH = 44.6 °C<br>SC = 5.0 °C (4.1 °C)<br>Tain = 20.0 °C | (d) Va = 200 m³/h<br>Gr = 33.5 m³/h<br>SH = 43.4 °C<br>SC = 6.3 °C (5.2 °C)<br>Tain = 20.0 °C |
|---|---|---|---|---|
| TEMPERATURE DISTRIBUTION | | | | |
| 16 SEGMENTS AVERAGE TEMPERATURE (°C) | 41.3  37.9  35.1  38.1<br>42.5  40.0  36.6  38.3<br>45.8  44.2  41.4  42.9<br>51.8  52.6  51.6  53.7<br>LARGEST TEMPERATURE DIFFERENCE (18.6°C) | 49.2  45.4  42.7  46.1<br>50.1  47.6  44.8  46.7<br>52.9  51.5  49.2  50.8<br>57.8  58.5  57.7  60.0<br>LARGEST TEMPERATURE DIFFERENCE (17.3°C) | 51.9  46.0  44.0  50.5<br>52.0  46.9  45.2  51.2<br>53.9  50.5  49.7  54.2<br>56.8  55.9  56.4  61.9<br>LARGEST TEMPERATURE DIFFERENCE (17.9°C) | 42.7  42.2  42.1  50.6<br>40.4  41.2  41.9  50.7<br>41.3  43.7  45.2  53.4<br>46.3  50.2  52.3  58.1<br>LARGEST TEMPERATURE DIFFERENCE (16.9°C) |
| RIGHT-LEFT TEMPERATURE DIFFERENCE ΔT | 2.3°C | 1.9°C | 0.1°C | 5.8°C |

LOW ←TEMP.→ HIGH

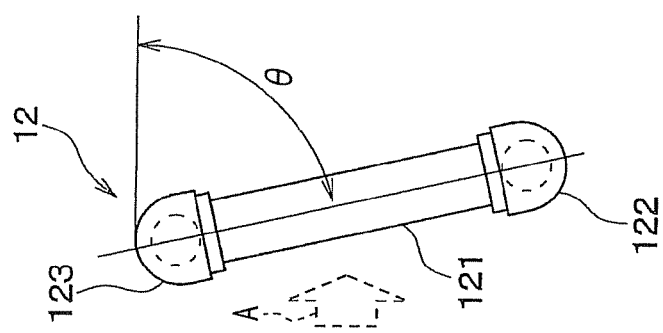
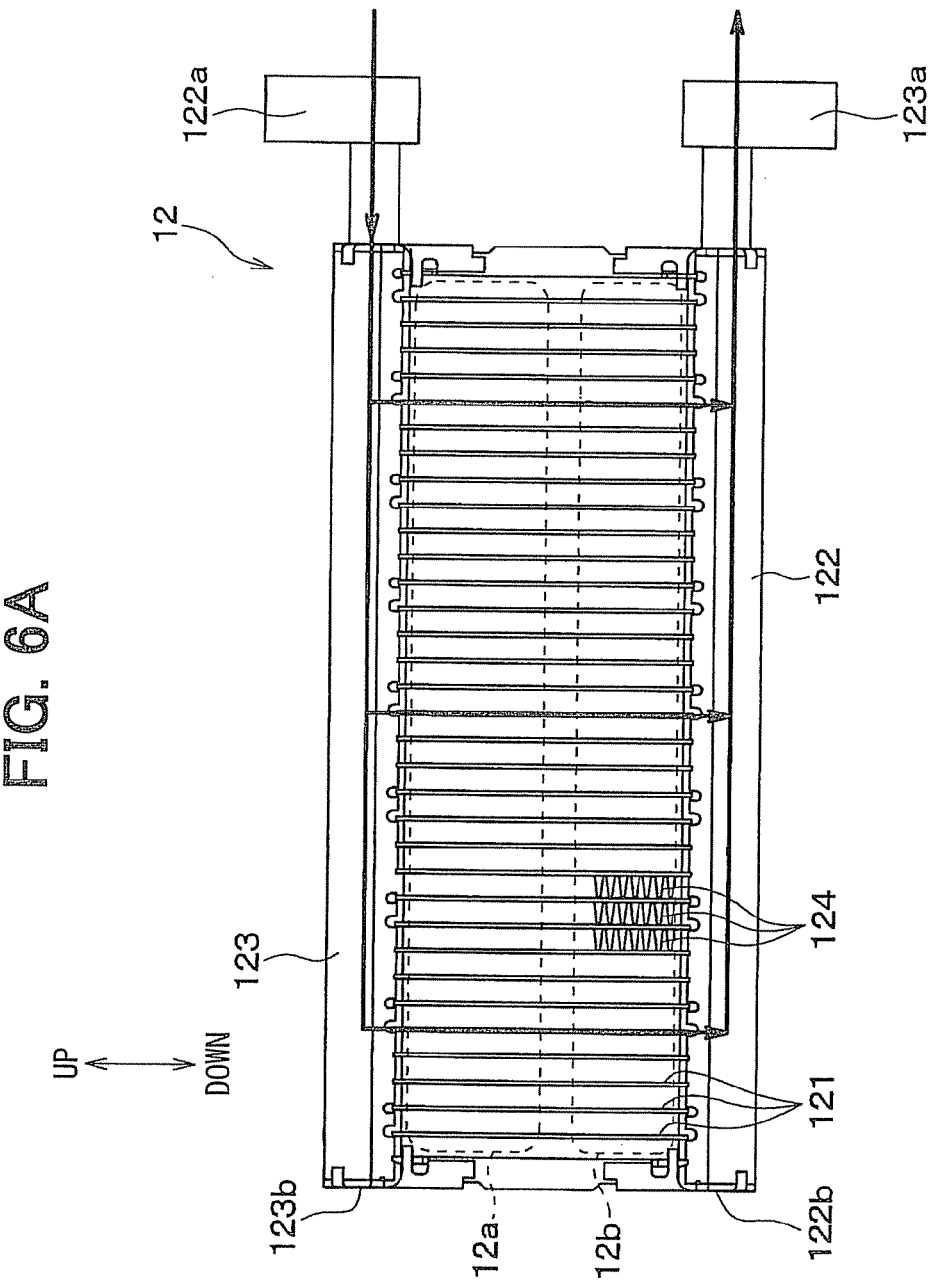
FIG. 6A
FIG. 6B

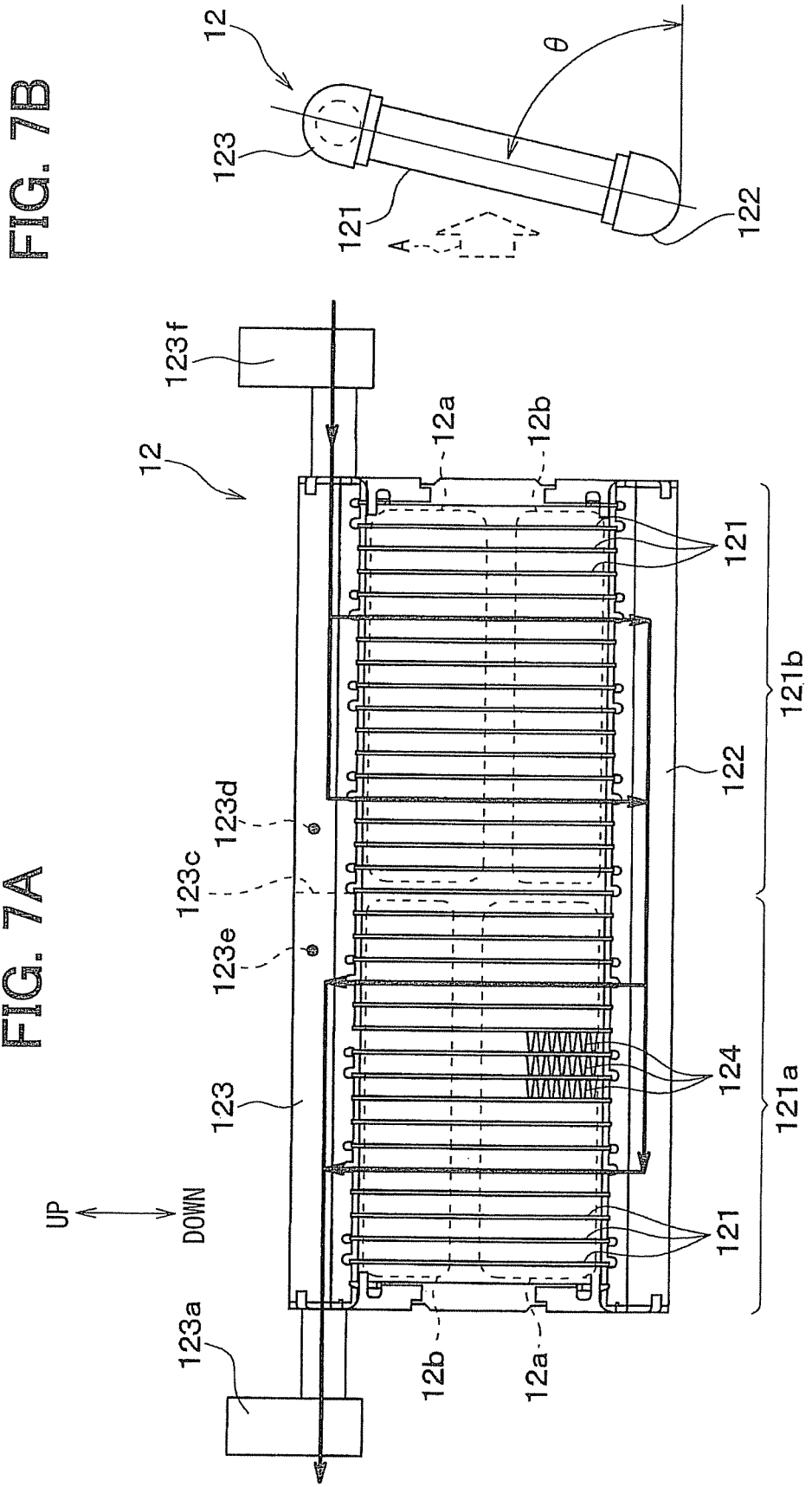

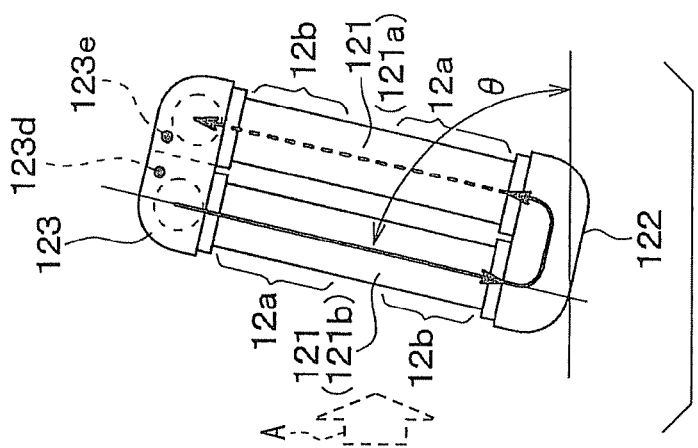
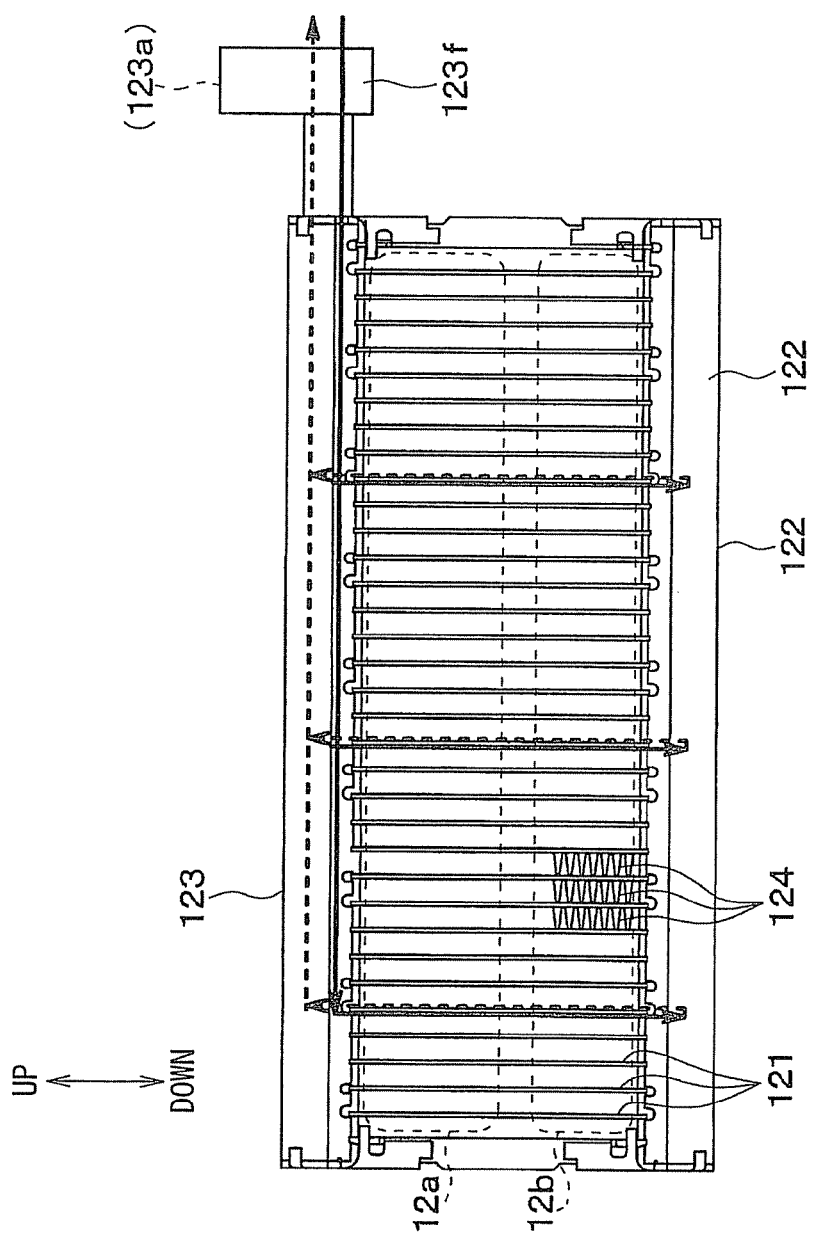

REFRIGERANT RADIATOR

CROSS REFERENCE TO RELATED APPLICATION

This application is based on and incorporates herein by reference Japanese Patent Applications No. 2011-001922 filed on Jan. 7, 2011, and No. 2011-276012 filed on Dec. 16, 2011.

TECHNICAL FIELD

The present invention relates to a refrigerant radiator for a vapor compression refrigerant cycle, in which refrigerant radiates heat.

BACKGROUND

Conventionally, a refrigerant radiator for a vapor compression refrigerant cycle is known, in which high-temperature and high-pressure refrigerant discharged from a compressor radiates heat through heat exchange with air. For example, Patent Document 1 (JP 2004-125346 A) discloses regarding a refrigerant radiator for a vapor compression refrigerant cycle, which is used for a vehicle air conditioner. The refrigerant radiator functions as a portion heating air blown into an internal space of a vehicle compartment, which is a space to be air-conditioned. The air to be blown into the vehicle compartment is heated by performing heat exchange with refrigerant discharged from a compressor, in the refrigerant radiator.

The refrigerant cycle described in Patent Document 1 is a supercritical refrigerant cycle, in which carbon dioxide is adopted as refrigerant and a refrigerant pressure in a high-pressure-side part of the cycle between an outlet of the compressor and an inlet of a decompression device is higher than a supercritical pressure of refrigerant. Therefore, in the refrigerant radiator described in Patent Document 1, refrigerant radiates heat in a supercritical state without phase transition.

However, if the refrigerant radiator in Patent Document 1 is used for a subcritical refrigerant cycle, in which the refrigerant pressure in the high-pressure-side part of the cycle is lower than the supercritical pressure of refrigerant, it may be difficult to sufficiently limit inhomogenization of temperature distribution of air blown into the vehicle compartment. The reason is that refrigerant changes from overheated gas-phase refrigerant into gas-liquid two-phase refrigerant, and furthermore, changes into supercooled liquid-phase refrigerant in the subcritical refrigerant cycle. In the subcritical refrigerant cycle, when refrigerant in the refrigerant cycle is in a gas or liquid phase, the refrigerant radiates heat with decreasing its temperature, i.e., both the temperature and enthalpy of the refrigerant reduce. However, when refrigerant is in a gas-liquid phase, only the enthalpy of refrigerant reduces while the refrigerant radiates heat without decreasing its temperature.

In the refrigerant radiator in Patent Document 1, a heat exchange area, where refrigerant is in the gas-liquid phase, and another heat exchange area, where refrigerant is in the gas or liquid phase, may be overlapped in a flow direction of air flowing into the refrigerant radiator. Therefore, temperature difference may be caused in air blown from the refrigerant radiator.

Furthermore, if air flowing out of the refrigerant radiator has the inhomogeneous temperature distribution, there may be a heat exchange area in the refrigerant radiator, where temperature difference between air flowing into the refrigerant radiator and refrigerant cannot be ensured enough. Hence, heat radiation ability of the whole refrigerant radiator may reduce. Such the reduction of heat radiation ability may cause increase of enthalpy of refrigerant flowing into an evaporator of the refrigerant cycle, and thereby it may reduce coefficient of performance (COP) of the refrigerant cycle.

SUMMARY

The present invention addresses at least one of the above disadvantages.

According to an aspect of the present invention, a refrigerant radiator is used for a vapor compression refrigerant cycle including a compressor configured to compress and discharge refrigerant. The refrigerant radiator is configured to radiate heat to air until gas-phase refrigerant discharged from the compressor changes at least to gas-liquid two-phase refrigerant. The refrigerant radiator includes a plurality of tubes through which the refrigerant flows. The tubes are stacked and arranged in a horizontal direction, and extend in a direction perpendicular to the horizontal direction or with an angle from the horizontal direction. The tubes include a first heat exchange area where refrigerant having a temperature equal to or higher than a standard temperature exchanges heat with first air to be blown to a space. The tubes further include a second heat exchange area where refrigerant having a temperature lower than the standard temperature exchanges heat with second air to be blown to the space. Generally, the second air has a temperature different from a temperature of the first air.

According to another aspect of the present invention, a refrigerant radiator is used for a vapor compression refrigerant cycle including a compressor configured to compress and discharge refrigerant. The refrigerant radiator is configured to radiate heat to air until gas-phase refrigerant discharged from the compressor changes at least to gas-liquid two-phase refrigerant. The refrigerant radiator includes a plurality of tubes through which the refrigerant flows. The tubes are stacked and arranged in a horizontal direction, and extend in a direction perpendicular to the horizontal direction or with an angle from the horizontal direction. The tubes include a first heat exchange area where refrigerant exchanges heat with first air to be blown to a space, and a second heat exchange area where refrigerant exchanges heat with second air to be blown to the space. Generally the second air has a temperature different from a temperature of the first air. The first heat exchange area includes a refrigerant-inlet side of the tubes, and the second heat exchange area includes a refrigerant-outlet side of the tubes.

Accordingly, temperature difference in air blown out of the refrigerant radiator is able to be effectively reduced, and heat radiation ability of the refrigerant radiator is able to be effectively improved.

BRIEF DESCRIPTION OF THE DRAWINGS

The invention, together with additional objectives, features and advantages thereof, will be best understood from the following description, the appended claims and the accompanying drawings in which:

FIG. 3A is a front view showing a refrigerant radiator according to the first embodiment;

FIG. 3B is a side view showing the refrigerant radiator according to the first embodiment;

FIG. 5 is a diagram showing experiment results of temperature distribution in the refrigerant radiator according to the first embodiment;

FIG. 6A is a front view showing a modification of the refrigerant radiator according to the first embodiment;

FIG. 6B is a side view showing the modification of the refrigerant radiator shown in FIG. 6A;

FIG. 7A is a front view showing a refrigerant radiator according to a second embodiment of the invention;

FIG. 7B is a side view showing the refrigerant radiator according to the second embodiment;

FIG. 8A is a front view showing a refrigerant radiator according to a third embodiment of the invention; and FIG. 8B is a side view showing the refrigerant radiator according to the third embodiment.

DETAILED DESCRIPTION OF THE DRAWINGS

Figure 1:
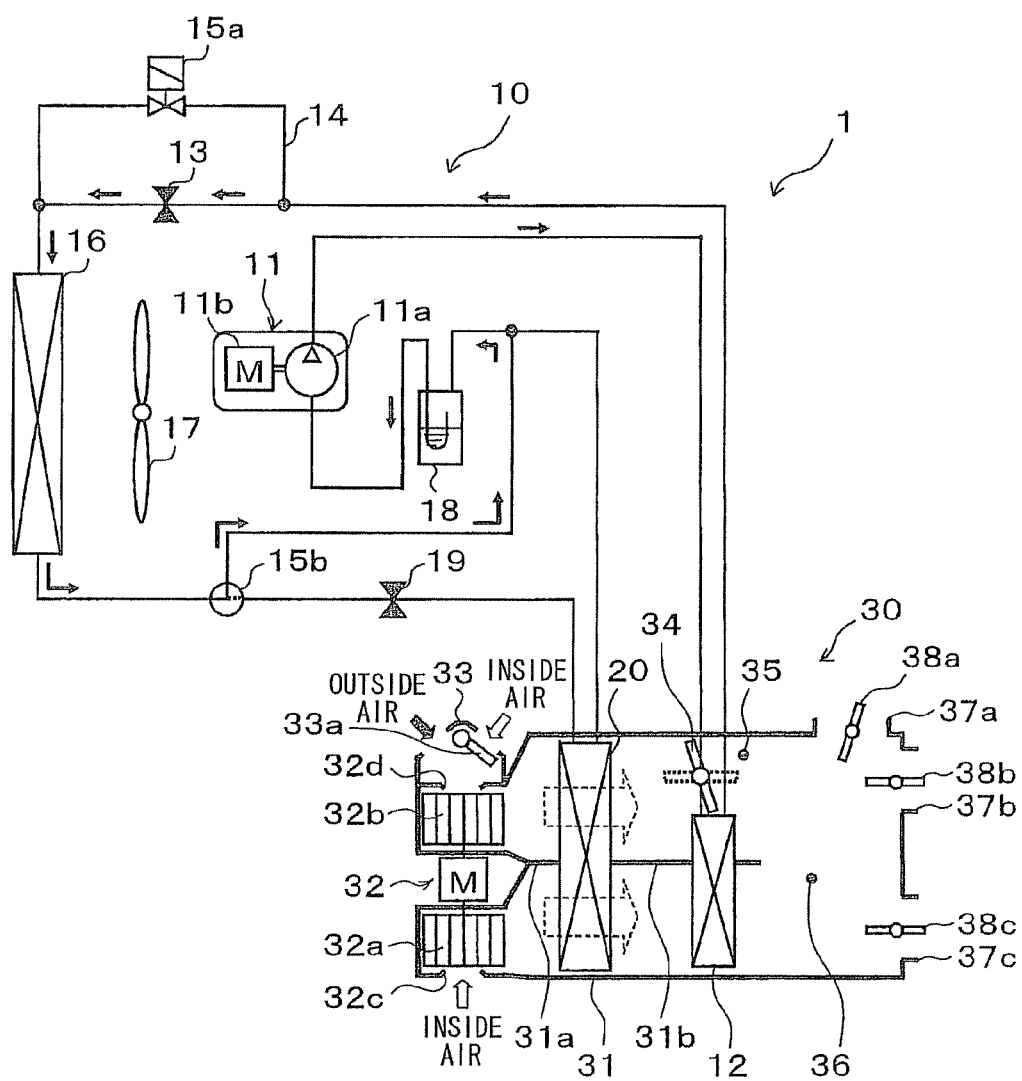
FIG. 1 is a schematic diagram showing a refrigerant flow passage of a heat pump cycle in a heating operation of a vehicle air conditioner according to a first embodiment of the invention.

Embodiments of the present invention will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the, embodiments can be combined, provided there is no harm in the combination.

(First Embodiment)

A first embodiment of the invention will be described referring to FIGS. 1 to 6B. In the present embodiment, a vehicle air conditioner 1 includes a heat pump cycle 10 (e.g., vapor compression refrigerant cycle) including a refrigerant radiator 12 of the invention. The vehicle air conditioner 1 can be used not only for a normal vehicle in which driving force is obtained from an internal combustion engine, but also for various vehicles such as a hybrid vehicle, an electrical vehicle, and so on.

The heat pump cycle 10 of the vehicle air conditioner 1 is used for heating or cooling air blown into an internal space of a vehicle compartment which is a space to be air-conditioned. The heat pump cycle 10 can perform a heating operation and a cooling operation by switching a refrigerant flow passage. In the heating operation, the internal space of the vehicle compartment is heated by heating the blown air which is a fluid to be heat-exchanged with refrigerant. In the cooling operation, the internal space of the vehicle compartment is cooled by cooling the blown air.

Figure 2:
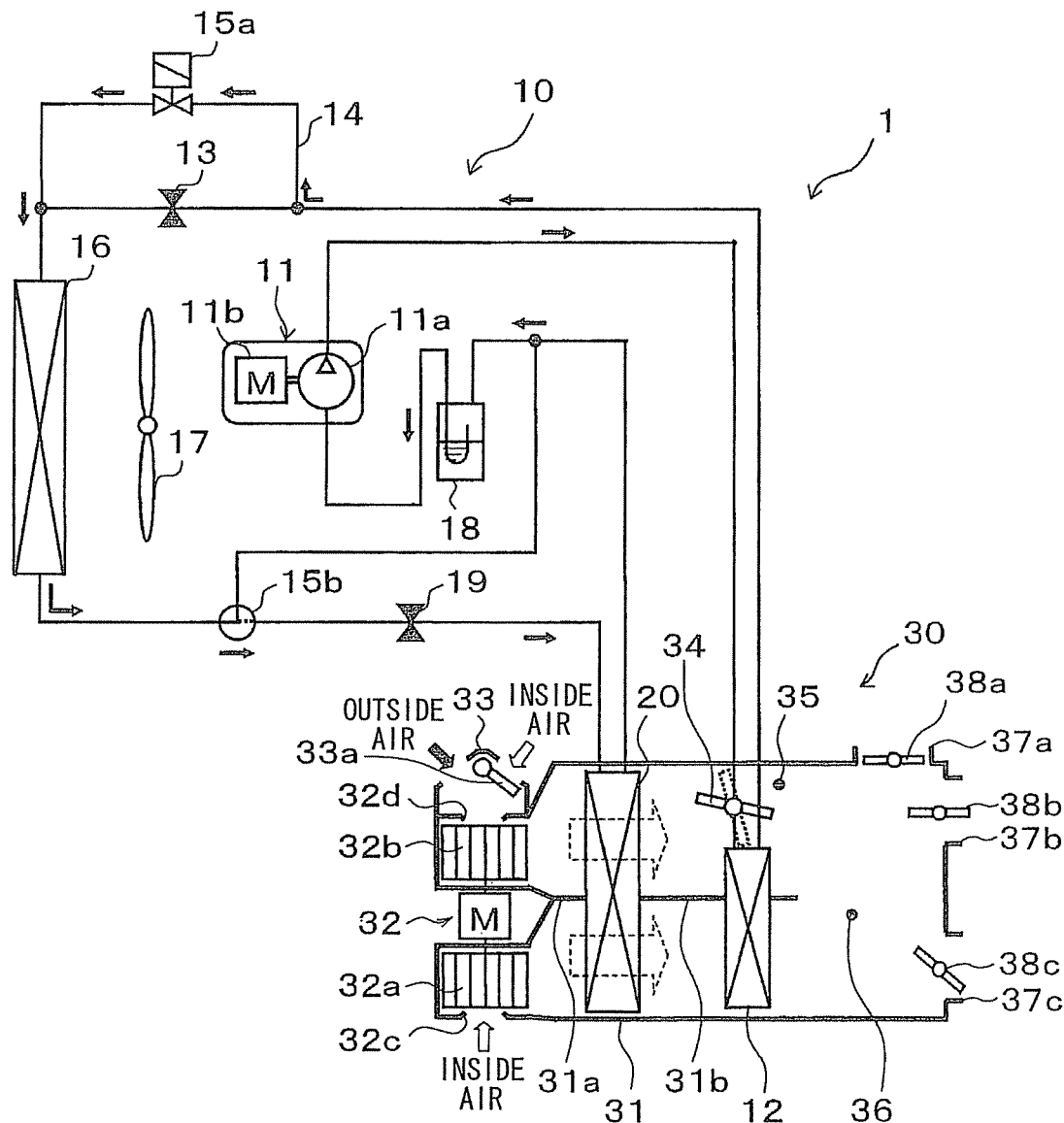
FIG. 2 is a schematic diagram showing a refrigerant flow passage of the heat pump cycle in a cooling operation of the vehicle air conditioner according to the first embodiment.

Solid arrows in FIG. 1 show a refrigerant flow in the heating operation, and solid arrows in FIG. 2 show a refrigerant flow in the cooling operation.

Hydrofluorocarbon (HFC)-based refrigerant (e.g., R134a) is adopted as refrigerant for the heat pump cycle 10 in the present embodiment. Thus, the heat pump cycle 10 is a subcritical refrigerant cycle in which a refrigerant pressure at a high-pressure side of the cycle 10, before compressing, is lower than a super critical pressure of the refrigerant. Here, refrigerant, which is generally used for a subcritical refrigerant cycle, such as hydrofluoroolefin (HFO)-based refrigerant (e.g., R1234yf), may be adopted as the refrigerant of the heat pump cycle 10. Furthermore, refrigerant is mixed with refrigerating machine oil for lubricating a compressor 11, and some amount of the oil circulates in the cycle 10 with the refrigerant.

The compressor 11 is arranged in an engine compartment to draw and compress refrigerant, and then to discharge the compressed refrigerant in the heat pump cycle 10. The compressor 11 is an electrical compressor in which a fixed-displacement compressor 11a is driven by an electrical motor 11b. The fixed-displacement compressor 11a is configured to discharge a fixed amount of refrigerant. As the fixed-displacement compressor 11a, various compression mechanisms can be adopted, for example, a scroll compressor, vane compressor and so on.

An operation (rotation speed) of the electrical motor 11b is controlled by a control signal output from an air conditioning controller described later. One of an alternating-current motor and a direct-current motor may be adopted as the electrical motor 11b. A refrigerant discharge capacity of the compressor 11 is changed by the rotation control. Thus, in the present embodiment, the electrical motor 11b is adopted as an example of a discharge capacity changing portion of the compressor 11.

An outlet of the compressor 11 is connected to a refrigerant inlet side of the refrigerant radiator 12. The refrigerant radiator 12 is a heating heat exchanger located in a casing 31 of an air conditioning unit 30 of the vehicle air conditioner 1. In the refrigerant radiator 12, heat exchange is performed between high-temperature and high-pressure refrigerant discharged from the compressor 11 and air having passed through a refrigerant evaporator 20 described later.

A refrigerant outlet side of the refrigerant radiator 12 is connected to a fixed throttle 13, which is used as an example of a decompression portion in the heating operation. The fixed throttle 13 decompresses and expands refrigerant discharged from the refrigerant radiator 12 in the heating operation. As the fixed throttle 13, an orifice, a capillary tube or the like can be adopted. An outlet side of the fixed throttle 13 is connected to a refrigerant inlet side of an outside heat exchanger 16.

Moreover, the refrigerant outlet side of the refrigerant radiator 12 is connected to a bypass passage 14, which introduces the refrigerant discharged from the refrigerant radiator 12 into the outside heat exchanger 16 with bypassing the fixed throttle 13. In the bypass passage 14, an opening-closing valve 15a is provided. The opening-closing valve 15a is an electromagnetic valve in which opening and closing operations of the opening-closing valve 15a are controlled by a control voltage output from the air conditioning controller.

Pressure loss is much smaller when refrigerant passes through the opening-closing valve 15a, than that when refrigerant passes through the fixed throttle 13. Hence, when the opening-closing valve 15a is open, refrigerant flowing out of the refrigerant radiator 12 flows into the outside heat exchanger 16 through the bypass passage 14. When the opening-closing valve 15a is closed, the refrigerant flows into the outside heat exchanger 16 through the fixed throttle 13.

Accordingly, the opening-closing valve 15a can be adapted to switch a refrigerant passage of the heat pump cycle 10. Thus, the opening-closing valve 15a of the present embodiment is used as an example of a refrigerant passage switching portion. As the refrigerant passage switching portion, an electrical three-way valve may be adopted. The three-way valve switches between a refrigerant passage from the outlet side of the refrigerant radiator 12 to an inlet side of the fixed throttle 13 and a refrigerant passage from the outlet side of the refrigerant radiator 12 to an inlet side of the bypass passage 14.

At the outside heat exchanger 16, heat exchange is performed between low-pressure refrigerant flowing in the outside heat exchanger 16 and outside air blown from a blower 17. The outside heat exchanger 16 is arranged in the engine compartment to function as an evaporator which exerts a heat absorption action by evaporating low-pressure refrigerant in the heating operation, and to function as a radiator which radiates heat of high-pressure refrigerant in a cooling operation.

The blower 17 is an electrical blower in which an operation rate, i.e., a rotation speed (air blowing amount) is controlled by a control voltage output from the air conditioning controller. An outlet side of the outside heat exchanger 16 is connected to an electrical three-way valve 15b. An operation of the three-way valve 15b is controlled by a control voltage output from the air conditioning controller. The three-way valve 15b is used as an example of the refrigerant passage switching portion, along with the above-described opening-closing valve 15a.

More specifically, in the heating operation, the three-way valve 15b is switched to a refrigerant passage from the outlet side of the outside heat exchanger 16 to an inlet side of an accumulator 18. In the cooling operation, the three-way valve 15b is switched to a refrigerant passage from the outlet side of the outside heat exchanger 16 to an inlet side of a fixed throttle 19.

The fixed throttle 19 is used as an example of a decompression portion in the cooling operation. The fixed throttle 19 decompresses and expands refrigerant flowing out of the outside heat exchanger 16 in the cooling operation. A basic structure of the fixed throttle 19 is similar to the fixed throttle 13. An outlet side of the fixed throttle 19 is connected to a refrigerant inlet side of the refrigerant evaporator 20 used as an inside evaporator.

The refrigerant evaporator 20 is arranged upstream of the refrigerant radiator 12 in the casing 31 of the air conditioning unit 30. The refrigerant evaporator 20 is a cooling heat exchanger which cools air blown into the vehicle compartment by heat exchange with refrigerant flowing in the refrigerant evaporator 20. A refrigerant outlet side of the refrigerant evaporator 20 is coupled to the inlet side of the accumulator 18.

The accumulator 18 is a gas-liquid separator for separating the refrigerant on a low-pressure side of the heat pump cycle 10, after being compressed. The accumulator 18 separates refrigerant, which flows into the accumulator 18, into gas and liquid, and stores therein surplus refrigerant of the cycle 10. An outlet side of the accumulator 18, from which gaseous refrigerant is discharged, is connected to a suction side of the compressor 11. Therefore, the accumulator 18 can be used to prevent the compressor 11 from compressing the liquid refrigerant by limiting inflow of liquid refrigerant into the compressor 11. A detail structure of the refrigerant radiator 12 will be described referring to FIGS. 3A and 3B. In FIG. 3B, illustrations of an inlet connector 122a and an outlet connector. 123a are omitted for simplification. FIG. 3A indicates a state where the refrigerant radiator 12 is disposed in the casing 31 of the air conditioning unit 30. In the state of FIG. 3A, a longitudinal direction of the tubes 121 corresponds to the up-down direction shown in FIG. 3A.

As shown in FIGS. 3A and 3B, the refrigerant radiator 12 includes tubes 121, and a pair of header tanks 122, 123. High-temperature and high-pressure refrigerant discharged from the compressor 11 flows through the tubes 121. The header tanks 122, 123 are arranged at both end sides of the tubes 121 in a longitudinal direction of the tubes 121, respectively, to distribute refrigerant to the tubes 121 and to receive refrigerant from the tubes 121. The refrigerant radiator 12 is a single-pass type heat exchanger having tanks and tubes, where refrigerant flows in all the tubes 121 in the same direction.

Each of the tubes 121 is made of metal having superior heat conductivity (e.g. aluminum base alloy) and has a flat shape in a cross section perpendicular to the flow direction of refrigerant in the tube 121. Additionally, a flat surface of an outer periphery of the tube 121 is parallel to a flow direction A of air passing through the refrigerant radiator 12. As the tube 121, any one of a flattened tube having therein multiple flow passages and a flattened tube having therein a single flow passage may be adopted.

Furthermore, the tubes 121 are stacked and arranged in a stacking direction (e.g., a horizontal direction in FIG. 3A) such that the flat surfaces of the tubes 121 are parallel to each other. Between adjacent two of the tubes 121, an air passage is provided, through which air to be blown into the vehicle compartment flows. A fin 124 is arranged also between adjacent two of the tubes 121 to promote heat exchange between refrigerant and air blown into the vehicle compartment.

The fin 124 is a corrugated fin obtained by bending and forming a thin plate, which is made of the same material as the tubes 121, in a wavelike shape. Tops of the wave of the fin 124 are brazed and connected to the flat surfaces of adjacent tubes 121. In FIG. 3A, only a part of the fin 124 is illustrated for simplification, but the fin 124 is arranged almost all over an area between adjacent two of the tubes 121.

The header tanks 122 and 123 are hollow members and extend in the stacking direction of the tubes 121. In the present embodiment, the lower header tank 122 is used for distribution of refrigerant, and the upper header tank 123 is used for collection of refrigerant, in a state where the refrigerant radiator 12 is disposed in the casing 31 of the air conditioning unit 30.

Both the header tanks 122 and 123 are separation-type tanks, in which an inside of the tank is separated, and are made of the same material with the tubes 121. Each header tank 122, 123 includes a plate member and a tank member which are connected to each other to be hollow. End parts of the tubes 121 in its longitudinal direction are brazed and connected to the plate member, and the tank member is coupled to the plate member. The header tanks 122 and 123 may be formed by using a single tubular member or the like.

One side of the lower header tank 122 used for distribution of refrigerant in its extending direction has the inlet connector 122a. The inlet connector 122a includes a refrigerant inlet, which introduces refrigerant into the header tank 122, and functions as a connection part between the header tank 122 and the outlet side of the compressor 11. The other side of the header tank 122 in its extending direction is closed by a tank cap 122b, which is used as a closing member.

One side of the upper header tank 123 used for collection of refrigerant in its extending direction has the outlet connector 123a. The outlet connector 123a includes a refrigerant outlet, from which refrigerant in the header tank 123 is discharged. The outlet connector 123a functions as a connection part between the header tank 123 to the inlet side of the fixed throttle 13 and between the header tank 123 and the inlet side of the bypass passage 14. The other side of the header tank 123 in its extending direction is closed by a tank cap 123b, which is used as a closing member.

Therefore, as shown by bold arrows in FIG. 3A, in the refrigerant radiator 12, refrigerant discharged from the compressor 11 flows through the inlet connector 122a into the header tank 122, and then is distributed to the tubes 121 from the header tank 122. Subsequently, refrigerant flowing through the tubes 121 exchanges heat with air to be blown into the vehicle compartment at the time of passing through the tubes 121, and then flows out of the tubes 121. Refrigerant flowing out of the tubes 121 is collected in the header tank 123, and then flows out of the header tank 123 through the outlet connector 123a.

The heat pump cycle 10 of the present embodiment is the subcritical refrigerant cycle as described above. Thus, phase of refrigerant flowing through the tubes 121 changes with exchanging heat with air, in this order of overheated gas-phase refrigerant→gas-liquid two-phase refrigerant→supercooled liquid-phase refrigerant. Therefore, in the refrigerant radiator 12 of the present embodiment, refrigerant radiates heat to air at least until overheated gas-phase refrigerant changes into gas-liquid two-phase refrigerant.

As shown in FIG. 3B, the longitudinal direction of the tubes 121 of the refrigerant radiator 12 according to the present embodiment is inclined with respect to the horizontal direction. That is, the longitudinal direction of the tubes 121 has at least a vector component in the vertical (up-down) direction. In other wards, the flow direction of refrigerant flowing in the tubes 121 is inclined from the horizontal direction, and has an angle with respect to the horizontal direction.

In the present embodiment, an inclination angle $\theta$ ($-90° \leq \theta \leq 90°$) is defined as an angle between a line extending from an upstream side (e.g., the lower header tank 122) to a downstream side (e.g., the upper header tank 123) of the refrigerant radiator 12 in the refrigerant flow direction and a line extending from the upstream side of the refrigerant radiator 12 along the horizontal direction, as shown in FIG. 3B.

The inclination angle $\Theta$ changes from 0° to 90° in accordance with change of the flow direction of refrigerant flowing in the tubes 121 from the horizontal to vertical direction. For example, when the flow direction of refrigerant flowing in the tubes 121 is parallel to the horizontal direction, the inclination angle $\theta$ is 0°. When the refrigerant flow direction is directed upward in the vertical direction, the inclination angle $\theta$ is 90°. Furthermore, when the refrigerant flow direction is directed downward in the vertical direction, the inclination angle $\theta$ is $=90°$.

In the present embodiment, the refrigerant radiator 12 is arranged so as to satisfy a formula F1 described below, in a case where the inclination angle $\theta$ is in a range from 0° to 90°. Here, X is a refrigerant dryness degree at a predetermined position of the tubes 121, in which refrigerant flowing in the tubes 121 is in a gas-liquid two-phase state, and Re is a Reynolds number obtained from an average velocity (unit: m/s) of refrigerant flowing in the tubes 121.

$$Re \geq A \times X^6 + B \times X^5 + C \times X^4 + D \times X^3 + E \times X^2 + F \times X + G \quad (F1)$$

A=$-0.0537 \times \theta^2 + 9.7222 \times \theta + 407.19$
B=$-(-0.2093 \times \theta^2 + 37.88 \times \theta + 1586.3)$
C=$-0.3348 \times \theta^2 + 60.592 \times \theta + 2538.1$
D=$-(-0.2848 \times \theta^2 + 51.53 \times \theta + 2158.2)$
E=$-0.1402 \times \theta^2 + 25.365 \times \theta + 1062.8$
F=$-(-0.0418 \times \theta^2 + 7.5557 \times \theta + 316.46)$
G=$-0.0132 \times \theta^2 + 2.3807 \times \theta + 99.73$ Any position of the tubes 121, where refrigerant is in a gas-liquid two-phase state, may be adopted as the predetermined position of the tubes 121 arbitrarily. For example, the predetermined position may be a downstream position of the tubes 121 in the refrigerant flow direction. The predetermined position may be a position of the tubes 121, which is closer to the header tank 123 used for collection of refrigerant than the header tank 122 used for distribution of refrigerant.

The air conditioning unit 30 will be described referring to FIGS. 1 and 2. The air conditioning unit 30 is arranged inside an instrumental panel (dashboard) located at a front end of the vehicle compartment, and includes the casing 31 forming an outer shell. In the casing 31, a blower 32, the refrigerant radiator 12, the refrigerant evaporator 20 and the like are disposed.

The casing 31 defines an air passage through which air flows into the vehicle compartment. The casing 31 is made of a resin (e.g., polypropylene) having a suitable elasticity and being superior in strength.

The blower 32 is an electrical blower which drives and rotates two centrifugal multi-blade fans (e.g., sirocco fans) 32a and 32b by using a single electrical motor. The centrifugal fans 32a and 32b are contained in two different scroll casings respectively. A rotation axis of the electrical motor extends almost in the vertical direction, and the first centrifugal fan 32a is arranged under the second centrifugal fan 32b. A rotation speed (air blowing amount) of the blower 32 is controlled by a control voltage output from the air conditioning controller.

The upper scroll casing containing the second centrifugal fan 32b has a second air inlet 32d. An inside/outside air switch device 33 is disposed upstream of the second air inlet 32d. The inside/outside air switch device 33 selectively introduces air (inside air) inside the vehicle compartment and/or air (outside air) outside the vehicle compartment into the second air inlet 32d. The inside/outside air switch device 33 has an inside air inlet and an outside air inlet, which introduce inside air and outside air into the casing 31 respectively.

Within the inside/outside air switch device 33, an inside/outside air switch door 33a is arranged to continuously adjust open areas of the inside air inlet and outside air inlet, thereby changing a ratio between a flow amount of inside air and a flow amount of outside air. The inside/outside air switch door 33a is actuated by a servomotor (not shown), and an operation of the servomotor is controlled by a control signal output from the air conditioning controller.

The lower scroll casing containing the first centrifugal fan 32a has a first air inlet 32c open to the vehicle compartment. Thus, the first air inlet 32c introduces only inside air into the casing 31.

The refrigerant evaporator 20 is arranged downstream of the blower 32 in the air flow direction A, and the refrigerant radiator 12 is arranged downstream of the refrigerant evaporator 20 in the air flow direction A. In other wards, the refrigerant evaporator 20 is arranged upstream of the refrigerant radiator 12 in the air flow direction A.

The air passage of the casing 31 includes a duct 31a between a downstream side of the blower 32 and an upstream side of the refrigerant evaporator 20. The duct 31a is partitioned to guide air blown from the second centrifugal fan 32b to an upper part of the refrigerant evaporator 20, and to guide air blown from the first centrifugal fan 32a to a lower part of the refrigerant evaporator 20.

Moreover, the air passage of the casing 31 includes a partition plate 31b between a downstream side of the refrigerant evaporator 20 and an upstream side of the refrigerant radiator 12. The partition plate 31b guides air blown from the upper part of the refrigerant evaporator 20 to an upper part of the refrigerant radiator 12, and guides air blown from the lower part of the refrigerant evaporator 20 to a lower part of the refrigerant radiator 12.

Therefore, in the vehicle air conditioner 1 of the present embodiment, air introduced from the inside/outside air switch device 33 is guided and flows through the second centrifugal fan 32b into the upper part of the refrigerant radiator 12, and air introduced from the first air inlet 32c flows through the first centrifugal fan 32a into the lower part of the refrigerant radiator 12.

As described above, refrigerant flows from a bottom upwardly in the tubes 121 of the refrigerant radiator 12 of the present embodiment. Thus, air introduced from the first air inlet 32c exchanges heat with refrigerant in a first heat exchange area 12a (see FIG. 3A) including refrigerant inlet sides of the tubes 121, and air introduced from the inside/outside air switch device 33 exchanges heat with refrigerant in a second heat exchange area 12b (see FIG. 3A) including refrigerant outlet sides of the tubes 121.

The phase of refrigerant flowing through the tubes 121 changes in the order of overheated gas-phase refrigerant gas-liquid two-phase refrigerant supercooled liquid-phase refrigerant. Hence, relatively high-temperature refrigerant flows near the inlet sides of the tubes 121, and relatively low-temperature refrigerant flows near the outlet sides of the tubes 121.

When a temperature of gas-liquid two-phase refrigerant flowing in the tubes 121 is assumed to be a standard temperature T1, the first heat exchange area 12a can be considered to be a heat exchange area of the tubes 121 where refrigerant has a temperature equal to or more than the standard temperature 11. Additionally, the second heat exchange area 12b can be considered to be a heat exchange area of the tubes 121 where refrigerant has a temperature less than the standard temperature T1. In other words, the partition plate 31b of the present embodiment is arranged such that the first heat exchange area 12a is the heat exchange area where refrigerant has a temperature equal to or more than the standard temperature T1, and such that the second heat exchange area 12b is the heat exchange area where refrigerant has a temperature less than the standard temperature T1. Therefore, the first heat exchange area 12a is located under the partition plate 31b, and that the second heat exchange area 12b is located above the partition plate 31b.

When the inside/outside air switch device 33 introduces outside air into the casing 31, a temperature of air (second air) blown from the second centrifugal fan 32b is different from a temperature of air (first air) blown from the first centrifugal fan 32a.

When the heating operation, in which the internal space of the vehicle compartment is heated, is performed in a condition where an outside-air temperature is low, the outside-air temperature is generally lower than an inside-air temperature. Thus, if the inside/outside air switch device 33 introduces outside air into the casing 31, the temperature of the first air blown from the first centrifugal fan 32a may become higher than the temperature of the second air blown from the second centrifugal fan 32b.

The air conditioning unit 30 includes a bypass passage 35 above the refrigerant radiator 12 inside the casing 31. The bypass passage 35 causes air having passed through the refrigerant evaporator 20 to bypass the refrigerant radiator 12. In the bypass passage 35, an air mix door 34 is arranged to adjust a ratio between an amount of air flowing through the refrigerant radiator 12 and an amount of air flowing through the bypass passage 35.

A confluence space 36 (air mix space) is provided downstream of the refrigerant radiator 12 and the bypass passage 35, where air heated by heat exchange with refrigerant at the refrigerant radiator 12 and not-heated air having passed through the bypass passage 35 are mixed with each other. The air having passed through the bypass passage 35 flows into an upper area of the confluence space 36, and the air having passed through the refrigerant radiator 12 flows into a lower area of the confluence space 36. Hence, an air temperature increases from the top downwardly in the confluence space 36.

The most downstream side of the casing 31 has openings from which conditioned air mixed in the confluence space 36 is blown out to the internal space of the vehicle compartment. Here, the internal space of the vehicle compartment is an example of the space to be air-conditioned. The openings includes a defroster opening 37a, from which conditioned air is blown toward an inner surface of a vehicle windshield, a face opening 37b, from which conditioned air is blown toward an upper part of a passenger in the vehicle compartment, and a foot opening 37c, from which conditioned air is blown toward a foot area of the passenger.

The air mix door 34 adjusts the ratio between a flow amount of air flowing through the bypass passage 35 and a flow amount of air flowing through the refrigerant radiator 12, so that the air mix door 34 adjusts the temperature distribution of air in the confluence space 36. The air mix door 34 is actuated by a servomotor in which an operation of the servomotor is controlled by a control signal output from the air conditioning controller.

A defroster door 38a, a face door 38b, and a foot door 38c are arranged at upstream sides of the defroster opening 37a, the face opening 37b, and the foot opening 37c in the air flow direction, respectively, thereby regulating open areas of the corresponding openings 37a, 37b, 37c.

The defroster door 38a, the face door 38b, and the foot door 38c are used as examples of an opening mode switch portion which switches an opening mode. These doors 38a, 38b, 38c are actuated by a servomotor (not shown) through a link mechanism or the like. An operation of the servomotor is controlled by a control signal output from the air conditioning controller.

Downstream sides of the defroster opening 37a, the face opening 37b, and the foot opening 37c in the air flow direction communicate respectively with a defroster outlet, a face outlet, and a foot outlet, which are provided in the vehicle compartment, through ducts defining therein air passages. For example, the face opening 37b communicates with front face outlets P1 and with side face outlets P2.

Figure 4:
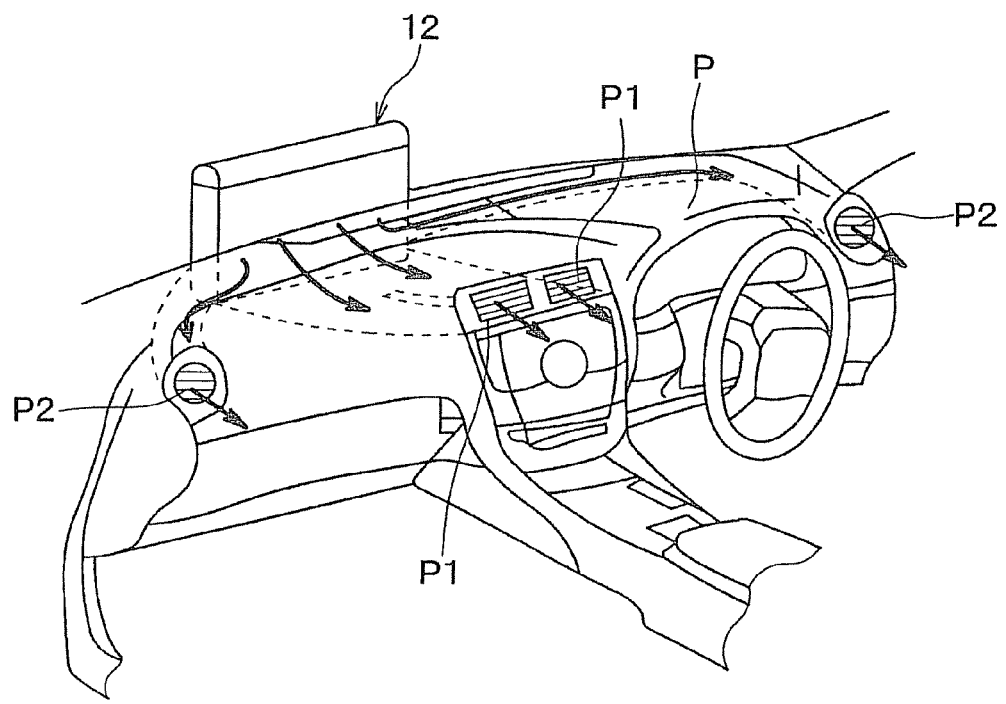
FIG. 4 is a schematic diagram showing an arrangement state of the refrigerant radiator according to the first embodiment.

As shown in FIG. 4, the front face outlets P1 are provided at a center part of the front end of the vehicle compartment in a right-left direction of the instrument panel P, and the side face outlets P2 are provided at both end parts of the front end of the vehicle compartment in the right-left direction.

As shown in FIG. 4, the front face outlets P1 and the side face outlets P2 are provided at multiple positions for a driver and a front passenger. Therefore, for example, air heated at a driver-side heat exchange area of the refrigerant radiator 12 is blown mainly toward the driver, and air heated at a passenger-side heat exchange area of the refrigerant radiator 12 is blown mainly toward the front passenger, in the heating operation.

An electrical control part of the present embodiment will be described. The air conditioning controller includes a known microcomputer and its peripheral circuit. The microcomputer includes a central processing unit (CPU), a read-only memory (ROM), and a random-access memory (RAM). The air conditioning controller performs a variety of calculations and processes based on an air-conditioning control program stored in the ROM, and controls operations of various air conditioning control components 11, 15a, 15b, 17, 32 and the like connected to an output side of the air conditioning controller.

An input side of the air conditioning controller is connected to a sensor group which is used for controlling air conditioning. The sensor group includes an inside air sensor, an outside air sensor, a solar sensor, an evaporator temperature sensor, a discharged refrigerant temperature sensor, and an outlet refrigerant temperature sensor. The inside air sensor detects a temperature (inside air temperature) in the vehicle compartment, and the outside air sensor detects an outside air temperature. The solar sensor detects a solar radiation amount entering into the vehicle compartment, and the evaporator temperature sensor detects a temperature (evaporator temperature) of air immediately after flowing out of the refrigerant evaporator 20. The discharged refrigerant temperature sensor detects a temperature of refrigerant discharged from the compressor 11, and the outlet refrigerant temperature sensor detects a temperature of refrigerant flowing at the outlet side of the outside heat exchanger 16.

Additionally, the input side of the air conditioning controller is connected to an operation panel (not shown) arranged near the instrument panel located at the front end of the vehicle compartment. Operation signals output from various air conditioning operation switches provided at the operation panel are input to the input side of air conditioning controller. The air conditioning operation switch provided at the operation panel includes an activation switch for operating the vehicle air conditioner 1, a temperature setting switch for setting a temperature in the vehicle compartment, and a selecting switch for selecting an operation mode.

The air conditioning controller is configured to include control portions which control the electrical motor 11b of the compressor 11, the opening-closing valve 15a, the three-way valve 15b, and the like. In the present embodiment, a control portion (a hardware and a software) which controls the operation of the compressor 11 is adopted as a refrigerant discharge capacity control portion. A control portion, which controls operations of the valves 15a, 15b adopted as the refrigerant passage switching portion, is used as a refrigerant passage control portion.

An operation of the vehicle air conditioner 1 of the present embodiment will be described. As described above, the vehicle air conditioner 1 of the present embodiment is able to perform the heating operation, where the internal space of the vehicle compartment is heated, and the cooling operation, where the internal space of the vehicle compartment is cooled. Each of the heating and cooling operations of the vehicle air conditioner 1 will be described below.

(a) Heating Operation

The heating operation of the vehicle air conditioner 1 shown in FIG. 1 starts when a heating operation mode is selected by the selecting switch in a state where the activation switch of the operation panel is ON. In the heating operation, the air conditioning controller activates the inside/outside air switch door 33a such that outside air is introduced into the casing 31 from the inside/outside air switch device 33. In the heating operation, it is not necessary to introduce only outside air from the inside/outside air switch device 33. Both inside air and outside air may be introduced such that an introduced outside-air amount is larger than an introduced inside-air amount.

Additionally, the air conditioning controller closes the opening-closing valve 15a of the heat pump cycle 10, and selects the refrigerant passage from the outlet side of the outside heat exchanger 16 through the three-way valve 15b to the inlet side of the accumulator 18. Accordingly, the heat pump cycle 10 is switched to the refrigerant passage shown by solid arrows in FIG. 1.

When the refrigerant passage shown in FIG. 1 is selected in the heating operation, the air conditioning controller reads in detection signals from the above-described sensor group used for controlling air conditioning and operation signals from the operation panel. Subsequently, the air conditioning controller calculates a target outlet air temperature TAO, which is a target temperature of air blown into the vehicle compartment, based on the detection signals and the operation signals. Moreover, the air conditioning controller determines an operation state of each air conditioning control component 11, 15a, 15b, 17, 32 connected to the output side of the air conditioning controller based on the calculated target outlet air temperature TAO and the detection signals from the sensor group.

For example, a refrigerant discharge capacity of the compressor 11, i.e., a control signal output from the air conditioning controller to the electrical motor of the compressor 11 is determined as follows. First, a target evaporator air temperature TEO of the refrigerant evaporator 20 is determined based on the target outlet air temperature TAO by using a control map, which is stored in the air conditioning controller in advance.

Subsequently, a control signal output from the air conditioning controller to the electrical motor of the compressor 11 is determined, based on a deviation between the target evaporator air temperature TEO and a temperature of air blown from the refrigerant evaporator 20, which is detected by the evaporator temperature sensor. The control signal is determined by using a feed back control method such that the temperature of air blown from the refrigerant evaporator 20 approaches to the target evaporator temperature TEO.

A control signal output from the air conditioning controller to the servomotor of the air mix door 34 is determined such that a temperature of air blown into the vehicle compartment becomes a passenger-desired temperature set by the temperature setting switch. The control signal input to the servomotor of the air mix door 34 is determined based on the target outlet air temperature TAO, the temperature of air blown from the refrigerant evaporator 20, and a temperature of refrigerant discharged from the compressor 11, which is detected by the discharged refrigerant temperature sensor.

In the heating operation, as shown in FIG. 1, an open area of the air mix door 34 may be controlled such that all of air blown from the blower 32 passes through the refrigerant radiator 12.

The air conditioning controller outputs the control signals or the like, which are determined as described above, to each air conditioning control component 11, 15a, 15b, 17, 32. Until the air conditioning controller requests a stop of operation of the vehicle air conditioner 1, a control routine is performed every predetermined control cycle. The control routine includes the above-described processes: read-in of detection signals and operation signals→calculation of a target outlet air temperature TAO→determination of an operation state of each air conditioning control component→output of a control voltage and a control signal. The repeat of the control routine is performed in the cooling operation, basically similar to the heating operation.

In the heating operation, high-pressure refrigerant discharged from the compressor 11 flows into the refrigerant radiator 12 in the heat pump cycle 10. Refrigerant flowing in the refrigerant radiator 12 radiates heat to air by heat exchange with the first and second airs blown from the blower 32 into the refrigerant radiator 12. Accordingly, the first and second airs blown into the vehicle compartment are heated.

High-pressure refrigerant flowing out of the refrigerant radiator 12 flows into the fixed throttle 13 to be decompressed and expanded, because the opening-closing valve 15 is closed. Low-pressure refrigerant flowing out of the fixed throttle 13 flows into the outside heat exchanger 16. Low-pressure refrigerant flowing in the outside heat exchanger 16 absorbs heat from outside air blown from the blower 17 to be evaporated.

Refrigerant flowing out of the outside heat exchanger 16 flows into the accumulator 18 to be separated into gas and liquid, because the three-way valve 15b is switched to the refrigerant passage from the outlet side of the outside heat exchanger 16 to the inlet side of the accumulator 18 in the heating operation. Gas-phase refrigerant obtained by gas-liquid separation in the accumulator 18 flows into the compressor 11 to be compressed.

Thus, in the heating operation, the first and second airs are heated by heat of refrigerant discharged from the compressor 11 at the refrigerant radiator 12. Accordingly, the internal space of the vehicle compartment which is the space to be air-conditioned can be heated.

In this case, the second air blown from the second centrifugal fan 32b is lower in temperature and humidity than the first air blown from the first centrifugal fan 32a. Hence, air flowing into the upper part of the confluence space 36 is also lower in temperature and humidity than air flowing into the lower part of the confluence space 36.

Thus, relatively low-humidity air in the upper part of the confluence space 36 is blown out of the defroster outlet toward the inner surface of the vehicle windshield through the defroster opening 37a. Consequently, the vehicle windshield can be prevented from misting effectively.

Additionally, the face outlet communicates with a middle part of the confluence space 36 in the vertical direction through the face opening 37b. The foot outlet communicates with the lower part of the confluence space 36 through the foot opening 37c. Therefore, air blown out of the face outlet toward an upper part of a passenger and air blown out of the foot outlet toward a lower part of the passenger are higher in temperature than air blown out of the defroster outlet. Therefore, warm feeling of the passenger can be improved.

Furthermore, a temperature of air blown out of the face outlet is lower then a temperature of air blown out of the foot outlet. Hence, a comfortable temperature distribution in the vehicle compartment can be obtained by the heating operation, so as to have cool-head and warm-feet for a passenger in the vehicle compartment.

(b) Cooling Operation

The cooling operation of the vehicle air conditioner 1 shown in FIG. 2 starts when a cooling operation mode is selected by the selecting switch in a state where the activation switch of the operation panel is ON. In the cooling operation, the air conditioning controller activates the inside/outside air switch door 33a such that inside air is introduced into the casing 31 from the inside/outside air switch device 33. In the cooling operation, the inside/outside air switch device 33 may introduce only inside air into the casing 31 when the target outlet air temperature TAO is determined within a high or low temperature range, and may introduce inside air and outside air such that an introduced inside-air amount is larger than an introduced outside-air amount when the TAO is determined within a middle temperature range.

Additionally, the air conditioning controller opens the opening-closing valve 15a, and selects the refrigerant passage from the outlet side of the outside heat exchanger 16 through the three-way valve 15b to the inlet side of the fixed throttle 19. Accordingly, the heat pump cycle 10 is switched to the refrigerant passage shown by solid arrows in FIG. 2.

In the cooling operation, high-pressure refrigerant discharged from the compressor 11 flows into the refrigerant radiator 12 in the heat pump cycle 10. Refrigerant in the refrigerant radiator 12 radiates heat to air by heat exchange with the first and second airs blown from the blower 32 into the refrigerant radiator 12. High-pressure refrigerant flowing out of the refrigerant radiator 12 flows into the outside heat exchanger 16 through the bypass passage 14 because the opening-closing valve 15 is open.

High-pressure refrigerant flowing in the outside heat exchanger 16 further radiates heat to outside air blown from the blower 17. Refrigerant flowing out of the outside heat exchanger 16 is decompressed and expanded at the fixed throttle 19 because the three-way valve 15b is switched to the refrigerant passage from the outlet side of the inside heat exchanger 16 to the inlet side of the fixed throttle 19.

Refrigerant flowing out of the fixed throttle 19 flows into the refrigerant evaporator 20 to absorb heat from air blown from the blower 32 and to evaporate. Accordingly, the refrigerant flowing through the evaporator 20 is evaporated, and air blown into the vehicle compartment is cooled. Refrigerant flowing out of the evaporator 20 flows into the accumulator 18 to be separated into gas and liquid.

Gas-phase refrigerant obtained by gas-liquid separation in the accumulator 18 flows into the compressor 11 to be compressed. Thus, in the cooling operation, air blown into the vehicle compartment is cooled by heat absorption and evaporation of low-pressure refrigerant at the refrigerant evaporator 20. Therefore, the internal space of the vehicle compartment can be cooled.

A heating/dehumidifying mode may be set in the cooling operation, when the passenger sets a temperature to be higher than a present temperature of the internal space of the vehicle compartment by using the temperature setting switch. In this case, an open degree of the air mix door 34 is adjusted such that a temperature of air blown into the vehicle compartment becomes higher than the present temperature of the internal space of the vehicle compartment. Also in this case, air flowing in the refrigerant evaporator 20 is cooled and an absolute humidity of the air is reduced. Therefore, the internal space of the vehicle compartment can be heated and dehumidified in the heating/dehumidifying mode.

Therefore, as described above, the vehicle air conditioner 1 of the present embodiment can perform the heating operation, the cooling operation, and the heating/dehumidifying mode of the cooling operation by switching the refrigerant passage of the heat pump cycle 10.

Moreover, in the present embodiment, because the above-described refrigerant radiator 12 is adopted, a temperature difference in air blown out of the refrigerant radiator 12 can be effectively reduced in the horizontal direction, and heat radiation ability of the refrigerant radiator 12 can be improved.

Specifically, in the refrigerant radiator 12 of the present embodiment, because the tubes 121 are stacked and arranged in the horizontal direction, overheated gas-phase refrigerant discharged from the compressor 11 flows into the tubes 121 upwardly from the distribution header tank 122 almost equally. Thus, the horizontal temperature distribution in air blown out of the refrigerant radiator 12 can be made approximately uniform.

In the vehicle air conditioner 1 of the present embodiment, air heated at the driver-side heat exchange area of the refrigerant radiator 12 is blown mainly toward a driver in the vehicle compartment, and air heated at the passenger-side heat exchange area of the refrigerant radiator 12 is blown mainly toward a front-passenger in the vehicle compartment. Thus, the equalization of the horizontal temperature distribution of air blown out of the refrigerant radiator 12 is quite effective for reduction of temperature difference between air blown toward the driver and air blown toward the front passenger in the vehicle compartment.

Moreover, relatively high-temperature refrigerant exchanges heat with the first air, which has a higher temperature than the second air, at the first heat exchange area 12a. Relatively low-temperature refrigerant exchanges heat with the second air, which has lower temperature than the first air, at the second heat exchange area 12b. Therefore, in both the first and second heat exchange areas 12a, 12b, temperature difference between air and refrigerant can be ensured, and accordingly, the heat radiation ability of the refrigerant radiator 12 can be improved.

The improvement of the heat radiation ability of the refrigerant radiator 12 can cause enthalpy of refrigerant flowing into the outside heat exchanger 16 to decrease. Hence, a heat amount absorbed by refrigerant at the outside heat exchanger 16 increases. Accordingly, refrigeration ability of the heat pump cycle 10 can be increased, and a coefficient of performance (COP) can be improved.

Furthermore, in the present embodinent, the refrigerant radiator 12 is arranged in the air conditioning unit 30 so as to satisfy the above-described formula F1. Thus, even if the phase of refrigerant changes in the tubes 121 of the refrigerant radiator 12, accumulation of refrigerant condensed in specific tube 121 can be prevented by adjusting parameters such as a flow velocity U, a viscosity $\mu$, a density $\rho$ of refrigerant, and the inclination angle $\theta$ of the refrigerant radiator 12.

Therefore, unevenness of pressure loss between refrigerants flowing in the tubes 121 can be limited, and generation of relatively low-temperature heat exchange area in the refrigerant radiator 12 can be prevented.

As a result, even when the flow velocity of refrigerant flowing in the tubes 121 changes due to an air-conditioning load variation or the like of the heat pump cycle 10, reduction of the heat radiation ability of the refrigerant radiator 12 can be prevented, and the horizontal temperature distribution of air heated at and blown from the refrigerant radiator 12 can be effectively made uniform.

The reason, why the condition of the parameters causes the temperature distribution to be equal, will be described below. According to experiments by the inventor, in the refrigerant radiator 12 of the present embodiment, because the tubes 121 are stacked and arranged in the horizontal direction, the horizontal temperature distribution of air blown from the refrigerant radiator 12 can be equalized when an air-conditioning load of the heat pump cycle 10 is high, i.e., when a flow rate of refrigerant circulating in the cycle 10 is high. However, if the air-conditioning load of the heat pump cycle 10 becomes low, i.e., if the flow rate of refrigerant circulating in the cycle 10 becomes low, the horizontal temperature distribution of the blown air may become unequal.

As shown in FIG. 5, the temperature distribution of air blown out of the refrigerant radiator 12 is observed with changing a refrigerant flow rate Gr. More specifically, the heat exchange area of the refrigerant radiator 12 is segmented into 16 areas, and an average temperature of air blown out of each of the segmented areas is calculated. Additionally, an average temperature of one-side 8-segmented areas (a right half area in each of examples (a) to (d) in FIG. 5) in the horizontal direction and an average temperature of the other-side 8-segmented areas (a left half area in each of examples (a) to (d) in FIG.5) of the segmented areas in the horizontal direction are calculated. Then, a temperature difference between the one-side and the other-side average temperatures is calculated as a right-left temperature difference $\Delta T$. The right-left temperature difference $\Delta T$ can be used as an index of equalization in the horizontal temperature distribution of air blown out of the refrigerator radiator 12.

In FIG. 5, characters, such as Va, Gr, SH, SC, and Tain, are illustrated to indicate an air flow rate Va, the refrigerant flow rate Gr, an overheat degree SH of refrigerant flowing at a refrigerant inlet of the refrigerant radiator 12, a supercooling degree SC of refrigerant flowing at a refrigerant outlet of the refrigerant radiator 12, and a temperature Tain of air flowing into the refrigerant radiator 12, respectively.

As shown in FIG. 5, a relatively low-temperature area (an almost center part encircled with a dash line, in the examples (b) and (c) of FIG. 5) of the heat exchange area expands with decreasing the refrigerant flow rate Gr. When the refrigerant flow rate Gr is further reduced, multiple relatively low-temperature areas (an almost center part and a left part which are encircled with dash lines respectively, in the examples (d) of FIG. 5) of the heat exchange area are produced.

With the decrease of the refrigerant flow rate Gr, the relatively low-temperature area, i.e., a heat exchange area having low ability in adequate heating of air increases. In this case, the heat radiation ability of the whole refrigerant radiator 12 may reduce. Furthermore, as shown in FIG.5, the generation of the relatively low-temperature area of the heat exchange area causes the right-left temperature difference AT to increase, thereby causing the horizontal temperature distribution of air blown out of the refrigerant radiator 12 to be unequal.

According to a further study by the inventor, the generation of the relatively low-temperature area of the heat exchange area is due to a difference between condensation degrees of refrigerants flowing in the tubes 121.

For example, when relatively low-temperature air flows into a specific area of the heat exchange area of the refrigerant radiator 12, refrigerant flowing through tubes 121 of the specific area (hereinafter refer to as a low-temperature area) is easier to be condensed than refrigerant flowing through tubes 121 of other area of the heat exchange area. In this case, if a pressure difference between refrigerants flowing at inlets of the tubes 121 and refrigerant flowing at outlets of the tubes 121 reduces in accordance with a decrease of the refrigerant flow rate Gr, a flow speed of condensed refrigerant further decreases. Thus, the condensed liquid refrigerant becomes difficult to flow out of the tubes 121.

If condensed refrigerant adheres to a wall surface or the like of a refrigerant passage of the tube 121 and stays in the tubes 121, passage cross-section of the tubes 121 of the low-temperature area reduces more than the tubes 121 of the other area of the heat exchange area. Accordingly, pressure loss of the tubes 121, where the condensed liquid refrigerant adheres to the wall surface, may increase. Consequently, high-temperature refrigerant discharged from the compressor 11 may become difficult to flow into the tubes 121 of the low-temperature area more than into the tubes 121 of the other area of the heat exchange area, and relatively low-temperature heat exchange area (low-temperature area) may be further generated.

The increase of pressure loss of the tubes 121 of the low-temperature area is caused by the condensation of refrigerant in the tubes 121. Thus, for estimation of the pressure loss of the tubes 121 of the low-temperature area, the following matters (1)-(3) and the like need to be considered, in addition to the refrigerant flow velocity U, which relates to energy for pushing refrigerant out of the tubes 121.

(1) Increase of pressure loss due to increase of the viscosity $\mu$ because of the condensation of refrigerant.

(2) Decrease of pressure loss due to decrease of the density ρ because of the condensation of refrigerant.

(3) Increase of pressure loss converted from gravity acting on the condensed refrigerant.

Therefore, if the inclination angle θ or the like is considered as a necessary parameter for calculating the refrigerant flow velocity U, the viscosity μ, the density ρ, and the gravity acting on the condensed refrigerant, the pressure loss of the tubes 121 of the low-temperature area can be set to be equal to pressure loss of the tubes 121 of the other area of the heat exchange area. Accordingly, generation of relatively low-temperature heat exchange area in the refrigerant radiator 12 can be prevented.

Based on the above point of view, an arrangement condition of the refrigerant radiator 12 for prevention of generation of the relatively low-temperature heat exchange area can be obtained by simulated calculation using the inclination angle θ and the Reynolds number Re. The Reynolds number Re is defined as a ratio between inertia force and viscous force by using the refrigerant flow velocity U, the viscosity μ, and the density ρ. The formula F1 is an approximation formula obtained from a result of the simulated calculation.

In the calculation of the arrangement condition of the refrigerant radiator 12, an average flow velocity of refrigerant flowing in the tubes 121 is used as the refrigerant flow velocity U. Refrigerant flowing into the refrigerant radiator 12 is assumed to be gas-phase refrigerant having an overheat degree of 45° C. under a pressure of 2 MPa, and air flowing into the refrigerant radiator 12 is assumed to have a flow rate of 200 m³/h under a temperature of 20° C. Moreover, a necessary viscosity $\mu_m$ of gas-liquid two-phase refrigerant for calculating the increase of pressure loss described in the above-described matter (1) is obtained by using a Taylor's formula, which is shown as formula F2 below.

$$\mu = \mu_l \left\{ 1 + 2.5 \alpha_g \frac{\rho_l - \rho_g}{\rho_l} \right\} \quad (F2)$$

$\mu_m$: a viscosity of gas-liquid two-phase fluid
$\mu_l$: a viscosity of liquid-phase fluid
$\alpha_g$: a void fraction
$\rho_l$: a density of liquid-phase fluid
$\rho_g$: a density of gas-phase fluid The void fraction $\alpha_g$ of gas-liquid two-phase fluid, which is necessary for the Taylor's formula, is obtained based on a Levy's formula (Levy's momentum minimal model), which is shown as formula F3 below.

$$\frac{1-\alpha_g}{\alpha_g} \frac{x}{1-x} = \left(\frac{\rho_g}{\rho_l}\right)^{1/2} \quad (F3)$$

x: a dryness degree
$\alpha_g$: a void fraction
$\rho_l$: a density of liquid-phase fluid
$\rho_g$: a density of gas-phase fluid Accordingly, in the present embodiment, the stay of liquid refrigerant condensed in specific tubes 121 can be prevented, and the horizontal temperature distribution of air blown out of the refrigerant radiator 12 can be equalized.

In the present embodiment, as shown in FIG. 3A, an example, where refrigerant flows in the tubes 121 from the bottom upwardly, is described. However, as shown in FIGS. 6A and 6B, refrigerant may flow in the tubes 121 from the top downwardly. Even in the case where the inclination angle θ is in a range from 0° to −90°, a formula expressed similarly to the formula F1 can be obtained. Thus, if the refrigerant radiator 12 is arranged so as to satisfy the obtained formula, the horizontal temperature distribution can be equalized.

The inclination angle θ is a positive number when refrigerant flows from the bottom upwardly in the tubes 121, and on the other hand, the inclination angle θ is a negative number when refrigerant flows from the top downwardly in the tubes 121. FIGS. 6A and 6B may correspond to FIGS. 3A and 3B respectively. In FIGS. 6A and 6B, the same components as the components illustrated in FIGS. 3A and 3B are assigned their corresponding numerals.

Similarly to the formula F1, coefficients from A to G of a formula of an arrangement condition of the refrigerant radiator 12 may be expressed as functions of the inclination angle θ, in both cases where refrigerant flows from the bottom upwardly in the tubes 121 and where refrigerant flows from the top downwardly in the tubes 121. Accordingly, the inclination angle θ can be applied to both the formulae by converting sign of the inclination angle θ from plus to minus. Therefore, in any degree of the inclination angle θ, the horizontal temperature difference in air blown out of the refrigerant radiator 12 can be reduced.

As shown in FIGS. 6A and 6B, when refrigerant flows from the top downwardly in the tubes 121, the first heat exchange area including the refrigerant inlets of the tubes 121 is located at the upper part of the refrigerant radiator 12. The second heat exchange area including the refrigerant outlets of the tubes 121 is located at the lower part of the refrigerant radiator 12.

Thus, in FIGS. 6A and 6B, air blown from the second centrifugal fan 32b and air blown from the first centrifugal fan 32a may correspond to the first and second airs respectively.

Accordingly, in the heating operation, relatively high-temperature refrigerant can exchange heat with relatively low-temperature air blown from the second centrifugal fan 32b at the first heat exchange area 12a. Relatively low-temperature refrigerant can exchange heat with relatively high-temperature air blown from the first centrifugal fan 32a at the second heat exchange area 12b. Therefore, a vertical temperature difference of air blown out of the refrigerant radiator 12 can be reduced.

(Second Embodiment)

In a second embodiment, as shown in FIGS. 7A and 7B, an example, in which the refrigerant radiator 12 is modified, is described. In the second embodiment, the same parts as the first embodiment are assigned their corresponding numerals. In a refrigerant radiator 12 of the second embodiment, a header tank 123 is separated into two parts: a distribution space 123d and a collection space 123e, by providing a separator 123c in the upper header tank 123, so that the two spaces 123d and 123e are arranged in a longitudinal direction of the header tank 123 of the refrigerant radiator 12.

Thus, tubes 121 of the refrigerant radiator 12 can be divided into a first tube group 121a connected to the collection space 123e of the upper header tank 123 and a second tube group 121b connected to the distribution space 123d.

Moreover, the upper header tank 123 includes an inlet connector 123f provided to introduce refrigerant discharged from the compressor 11 into the distribution space 123d, and an outlet connector 123a to discharge refrigerant from the collection space 123e.

In the refrigerant radiator 12 of the second embodiment, as shown by bold arrows in FIG. 7A, refrigerant discharged from the compressor 11 flows into the distribution space 123d of the upper header tank 123 via the inlet connector 123f, and is distributed to the second tube group 121b of the tubes 121.

Refrigerant flowing in the second tube group 121b of the tubes 121 exchanges heat with air to be blown into the vehicle compartment, and then flows out of the second tube group 121b. Subsequently, refrigerant flowing out of the second tube group 121b is collected in a lower header tank 122, and then distributed to the first tube group 121a of the tubes 121.

Refrigerant flowing in the first tube group 121a of the tubes 121 exchanges heat with air to be blown into the vehicle compartment, and then flows out of the first tube group 121a. And then, refrigerant flowing out of the first tube group 121a is collected in the collection space 123e of the upper header tank 123, and subsequently, flows out of the collection space 123e via the outlet connector 123a. Refrigerant flows from the top downwardly in the second tube group 121b, and flows from the bottom upwardly in the first tube group 121a.

Moreover, in the refrigerant radiator 12 of the present embodiment, refrigerant flowing in the second tube group 121b exchanges heat substantially in state of the gas phase. Furthermore, the gas-phase refrigerant changes into the gas-liquid two-phase refrigerant between a midstream part and a downstream part of the first tube group 121a in a refrigerant flow direction, and subsequently, changes into the liquid-phase refrigerant with flowing further downstream.

Also in the refrigerant radiator 12 of the present embodiment, because the tubes 121 are stacked and arranged in the horizontal direction, the horizontal temperature difference can be effectively reduced, similar to the first embodiment.

Specifically, refrigerant radiates heat substantially in state of the gas phase in a heat exchange area of the second tube group 121b. Thus, the horizontal temperature difference caused by a difference of condensation degrees between refrigerants flowing in the tubes 121 can be reduced.

Additionally, in a heat exchange area of the first tube group 121a, the horizontal temperature difference caused by the difference of condensation degrees between refrigerants flowing in the tubes 121 can be reduced effectively, by satisfying the arrangement condition of the inclination angle θ of the refrigerant radiator 12 as is the case with the first embodiment. Therefore, the horizontal temperature difference can be reduced in the whole refrigerant radiator 12.

In the heat exchange area of the first tube group 121a, the first heat exchange area 12a, where relatively high-temperature refrigerant flows, is located at a lower part of the refrigerant radiator 12, and the second heat exchange area 12b, where relatively low-temperature refrigerant flows, is located at a upper part of the refrigerant radiator 12, similarly to the example shown in FIG. 3A. Hence, the heat radiation ability of the refrigerant radiator 12 can be improved.

Furthermore, in the heat exchange area of the second tube group 121b, similarly to the example of FIG. 6A, the first heat exchange area 12a, where relatively high-temperature refrigerant flows, is located at the upper part of the refrigerant radiator 12, and the second heat exchange area 12b, where relatively low-temperature refrigerant flows, is located at the lower part of the refrigerant radiator 12. Thus, the vertical temperature difference can be effectively reduced.

In the refrigerant radiator 12 of the present embodiment, refrigerant in the second tube group 121b of the tubes 121 flows from the top downwardly, and refrigerant in the first tube group 121a of the tubes 121 flows from the bottom upwardly. However, refrigerant in the second tube group 121b may flow from the bottom upwardly, and refrigerant in the first tube group 121a may flow from the top downwardly.

(Third Embodiment)

A third embodiment will be described with reference to FIGS. 8A and 8B in which the refrigerant radiator 12 of the above-described embodiments is modified. In the third embodiment, the same parts as the first embodiment are assigned their corresponding numerals. In a refrigerant radiator 12 of the present embodiment, an inside of a header tank 123 is separated into a distribution space 123d and a collection space 123e, so that the spaces 123d and 123e are arranged in the air flow direction A.

Tubes 121 of the refrigerant radiator 12 of the present embodiment can be divided into a first tube group 121a connected to the collection space 123e and a second tube group 121b connected to the distribution space 123d, as with the second embodiment. The first tube group 121a is located at a downstream side of the second tube group 121b in the air flow direction A. Thus, in the present embodiment, the tubes 121 are arranged to be stacked in multiple (e.g., two) layers in the air flow direction A.

The header tank 123 includes an inlet connector 123f to introduce refrigerant discharged from the compressor 11 into the distribution space 123d, and an outlet connector 123a to discharge refrigerant from the collection space 123e.

Thus, in the refrigerant radiator 12 of the present embodiment, as shown by bold arrows in FIGS. 8A and 8B, refrigerant from the compressor 11 flows through in an order: the distribution space 123d of the upper header tank 123 the second tube group 121b of the tubes 121 (an upstream part of the tubes 121 in the air flow direction A) a lower header tank 122 the first tube group 121a of the tubes 121 (a downstream part of the tubes 121 in the air flow direction A) the collection space 123e of the upper header tank 123. Subsequently, refrigerant flows out of the refrigerant radiator 12 through the outlet connector 123a.

In the refrigerant radiator 12 of the present embodiment, refrigerant flowing in the second tube group 121b exchanges heat substantially in state of the gas phase. Furthermore, the gas-phase refrigerant changes into the gas-liquid two-phase refrigerant between a midstream part and a downstream part of the first tube group 121a in a refrigerant flow direction, and then changes into the liquid-phase refrigerant with flowing further downstream.

In the refrigerant radiator 12 of the present embodiment, because the tubes 121 are stacked and arranged in the horizontal direction, the horizontal temperature difference in air blown out of the refrigerant radiator 12 can be reduced, as with the first embodiment. In this case, similarly to the second embodiment, the horizontal temperature difference in heat exchange areas of both the first tube group 121a and the second tube group 121b can be reduced.

Similarly to the second embodiment, heat radiation ability of the heat exchange area of the first tube group 121a of the refrigerant radiator 12 can be improved, and the vertical temperature difference in the heat exchange area of the second tube group 121b can be reduced.

Thus, in the present embodiment, arbitrary position in the first tube group 121a from the midstream part to the downstream part thereof can be adopted as the predetermined position. Hence, an inclination angle θ of the refrigerant radiator 12 of the present embodiment is set to be a value similar to the first embodiment.

Accordingly, in the refrigerant radiator 12 of the present embodiment, refrigerant flowing in the second tube group 121b (the upstream heat exchange area in the air flow direction) radiates heat substantially in state of the gas phase.

Therefore, the heat radiation ability of the refrigerant radiator 12 is difficult to reduce, and the temperature difference in air blown out of the heat exchange area of the second tube group 121b is limited.

The first tube group 121a (the downstream heat exchange area in the air flow direction) is arranged to satisfy a formula, which is used in the case where refrigerant flows from the top downwardly in the tubes 121 similarly to the formula F1. Thus, effects similar to the first embodiment can be obtained. Therefore, as the whole of the refrigerant radiator 12, the reduction of the heat radiation ability can be limited and the horizontal temperature difference in air heated at and blown from the refrigerant radiator 12 can be limited.

In the refrigerant radiator 12 of the present embodiment, as shown in FIG. 8B, refrigerant distributed downwardly from the distribution space 123d of the upper header tank 123 U-turns through the lower header tank 122, and then flows upwardly back to the collection space 123e of the upper header tank 123.

Accordingly, an area (overheated area), through which overheated gas-phase refrigerant having a relatively high-temperature flows, can be provided at an upper part of the upstream heat exchange area in the air flow direction A. Additionally, an area (supercooled area), through which supercooled liquid-phase refrigerant having a relatively low-temperature flows, can be provided at an upper part of the downstream heat exchange area in the air flow direction A. Thus, the overheated area and the supercooled area can be overlapped in the air flow direction A. Therefore, the vertical temperature difference can be reduced further effectively.

In the present embodiment, an example is described, in which refrigerant flowing from an upstream part of the tubes 121 in the air flow direction A U-turns via the lower header tank 122, and flows into a downstream part of the tubes 121 in the air flow direction. However, refrigerant flowing from the downstream part of the tubes 121 in the air flow direction A may U-turn and flow into the upstream part of the tubes 121 in the air flow direction A.

(Other Embodiments)

The invention is not limited to the above-described embodiments. Unless departing the scope of the invention, the invention can be modified variously as below.

(1) In the above-described embodiments, tubes extending in one direction are adopted as the tubes 121 of the refrigerant radiator 12. However, the tubes 121 used for the refrigerant radiator 12 of the present invention are not limited to this. The tubes 121 may have a meander shape or the like which has at least a component extending in the vertical direction.

(2) In the refrigerant radiator 12 of the above-described embodiments, heat exchange is performed between refrigerant and air blown into the vehicle compartment, however, the refrigerant radiator 12 of the invention is not limited to this. For example, heat exchange between multiple kinds of fluids such as refrigerant, air, and other thermal medium may be performed.

Specifically, a refrigerant radiator described below can be adopted as the refrigerant radiator 12. The refrigerant radiator includes refrigerant tubes, through which refrigerant flows, and thermal medium tubes through which thermal medium flows. The refrigerant tubes and the thermal medium tubes are stacked and arranged alternately in the horizontal direction. An air passage, through which air flows, is provided between the refrigerant tube and the thermal medium tube. Additionally, a fin is provided in each air passage, and is connected to adjacent refrigerant tube and adjacent thermal medium tube. The fin promotes heat exchange between refrigerant and air and between thermal medium and air. Heat transfer from the refrigerant and the thermal medium can be increased through the fins.

(3) In the above-described embodiments, an example is described, in which the refrigerant radiator 12 is used for a vehicle air conditioner. In a device disposed in a vehicle, an arrangement condition of the device with respect to the horizontal direction may change by inclination of the whole vehicle. For example, the vehicle may be inclined by acceleration/deceleration of the vehicle, by right/left turn of the vehicle, by parking/stop of the vehicle on a slope, and so on. Therefore, in the above-described embodiments, a change amount $\Delta\theta$ due to the inclination of the vehicle relative to the inclination angle $\theta$ is preferred to be considered, and the formula F1 is prefer to be satisfied in a whole range of $\theta+\Delta\theta$.

(4) In the above-described embodiments, an example is described, in which the heat pump cycle 10 provided with the refrigerant radiator 12 is used for a vehicle air conditioner, but is not limited to this usage. For example, the heat pump cycle 10 may be used for a stationary air conditioner, a refrigerator, a cooling/heating device for an automatic dispenser or the like.

Furthermore, the refrigerant radiator 12 of the above embodiments may be configured as follows.

The refrigerant radiator 12 may be used for the vapor compression refrigerant cycle 10 including the compressor 11 configured to compress and discharge refrigerant. The refrigerant radiator 12 is configured to radiate heat to air until gas-phase refrigerant discharged from the compressor 11 changes at least to gas-liquid two-phase refrigerant. The refrigerant radiator 12 includes a plurality of tubes 121 through which the refrigerant flows. The tubes 121 are stacked and arranged in a horizontal direction, and extend in a direction perpendicular to the horizontal direction or with an angle from the horizontal direction. The tubes 121 may include a first heat exchange area 12a where refrigerant having a temperature equal to or higher than a standard temperature T1 exchanges heat with first air to be blown to a spade. The tubes 121 may further include a second heat exchange area 12b where refrigerant having a temperature lower than the standard temperature T1 exchanges heat with second air to be blown to the space and having a temperature different from a temperature of the first air.

Because the tubes 121 are stacked and arranged in the horizontal direction, the gas-phase refrigerant discharged from the compressor 11 flows into the tubes 121 almost equally. Thus, the horizontal temperature difference in air blown out of the refrigerant radiator 12 can be reduced.

Additionally, the first air exchanges heat with refrigerant in the first heat exchange area 12a, and the second air, which is different from the first air in temperature, exchanges heat with refrigerant in the second heat exchange area 12b. Therefore, the heat radiation ability of the refrigerant radiator 12 can be improved, or/and the vertical temperature difference in air blown out of the refrigerant radiator 12 can be reduced.

For example, a temperature of gas-liquid tow-phase refrigerant flowing in the tubes 121 or an average temperature of the refrigerant flowing in the tubes 121 can be adopted as the standard temperature T1.

The tubes 121 may not need to extend entirely with an angle from the horizontal direction. A part of the tubes 121 may extend with an angle from the horizontal direction.

Alternatively, the tubes 121 may include a first heat exchange area 12a where refrigerant exchanges heat with the first air, and a second heat exchange area 12b where refrigerant exchanges heat with the second air. Here, the first heat exchange area 12a includes the refrigerant-inlet side of the tubes 121, and the second heat exchange area 12b includes the refrigerant-outlet side of the tubes 121.

Also in this case, the horizontal temperature difference in air blown out of the refrigerant radiator 12 can be reduced. Moreover, the heat radiation ability of the refrigerant radiator 12 can be improved, or the vertical temperature difference in air blown out of the refrigerant radiator 12 can be reduced.

The temperature of the first air may be higher than the temperature of the second air. In this instance, relatively high-temperature refrigerant can exchange heat with the first air, which has higher temperature than the second air, at the first heat exchange area 12a. Relatively low-temperature refrigerant can exchange heat with the second air, which has lower temperature than the first air, at the second heat exchange area 12b.

Therefore, in both the first and second heat exchange areas 12a, 12b, temperature differences between air and refrigerant can be ensured, and accordingly, the heat radiation ability of the refrigerant radiator 12 can be improved.

In contrast, the temperature of the first air may be lower than the temperature of the second air. In such a case, relatively high-temperature refrigerant can exchange heat with the first air, which has lower temperature than the second air, at the first heat exchange area 12a. Relatively low-temperature refrigerant can exchange heat with the second air, which has higher temperature than the first air, at the second heat exchange area 12b.

Thus, the vertical temperature difference in air blown out of the refrigerant radiator 12 can be reduced.

In the refrigerant radiator 12, a heat exchanging portion including the tubes 121 may be configured to radiate heat until gas-phase refrigerant discharged from the compressor 11 changes to liquid-phase refrigerant.

Moreover, the tubes 121 may be inclined with the inclination angle θ between the flow direction of refrigerant flowing in the tubes 121 and the horizontal direction, and may be configured to satisfy the following formula, when the inclination angle θ is in a range from 0 to 90 degrees, $$Re \geq A \times X^6 + B \times X^5 + C \times X^4 + D \times X^3 + E \times X^2 + F \times X + G$$

where
$A = -0.0537 \times \theta^2 + 9.7222 \times \theta + 407.19$
$B = -(-0.2093 \times \theta^2 + 37.88 \times \theta + 1586.3)$
$C = -0.3348 \times \theta^2 + 60.592 \times \theta + 2538.1$
$D = -(-0.2848 \times \theta^2 + 51.53 \times \theta + 2158.2)$
$E = -0.1402 \times \theta^2 + 25.365 \times \theta + 1062.8$
$F = -(-0.0418 \times \theta^2 + 7.5557 \times \theta + 316.46)$
$G = -0.0132 \times \theta^2 + 2.3807 \times \theta + 99.73$ in which X is the dryness degree of refrigerant at a predetermined position of the tubes 121 where gas-liquid two-phase refrigerant flows, and Re is the Reynolds number at the predetermined position, which is calculated based on an average flow velocity (m/s) of refrigerant flowing in the tubes 121.

As a result of this, the condensation of refrigerant in the tubes 121 can be limited, and the unevenness of pressure loss between refrigerants flowing in the tubes 121 can be limited. Therefore, the horizontal temperature difference in air blown out of the refrigerant radiator 12 can be reduced further effectively.

A part of the tubes 121 may extend such that the flow direction of refrigerant is inclined to have an angle from the horizontal direction to a downward direction. The refrigerant radiator may further include the header tank 122, 123 extending the stacking direction of the tubes 121 and arranged at least one side of the tubes 121 in the longitudinal direction of the tubes 121, to collect and distribute refrigerant.

The inner space of the header tank 123 may be separated into the plurality of spaces 123d, 123e. One separated space 123d on one side of the header tank 123 may include the refrigerant inlet which introduces refrigerant. Another separated space 123e on the other side of the header tank 123 may include the refrigerant outlet which discharges refrigerant.

The tubes 121 may be arranged in multiple layers in the air flow direction A.

The tubes 121 may include the first tube group 121a where refrigerant flows from a bottom side upwardly, and the second tube group 121b where refrigerant flows from a top side downwardly. The tubes 121 may be arranged such that refrigerant flows in all the tubes 121 in the same direction.

In a case where the refrigerant cycle 10 is used for a vehicle air conditioner, the space may be the inner space of the vehicle compartment. Moreover, the first air may be air inside of the vehicle compartment, and the second air may be air outside of the vehicle compartment, In a general vehicle air conditioner, if the horizontal temperature difference is not equalized, a temperature difference between air blown toward a driver side and air blown toward a front-passenger side may enlarge. Thus, the reduction of the horizontal temperature difference may be much effective.

Furthermore, for example, during the heating operation of the vehicle compartment, air outside the vehicle compartment, which is lower temperature and lower humidity than air inside the vehicle compartment, may exchange heat with refrigerant at the second heat exchange area 12b to be blown toward the vehicle windshield. Additionally, air inside the vehicle compartment may exchange heat with refrigerant at the first heat exchange area 12a to be blown toward a passenger. Accordingly, the heat radiation ability of the refrigerant radiator 12 can be improved. Moreover, prevention of misting of the vehicle windshield and securement of sufficient warm feeling of a passenger can be provided.

Additional advantages and modifications will readily occur to those skilled in the art. The invention in its broader terms is therefore not limited to the specific details, representative apparatus, and illustrative examples shown and described.

What is claimed is:

1. A refrigerant radiator used for a vapor compression refrigerant cycle including a compressor configured to compress and discharge refrigerant, and the refrigerant radiator being configured to radiate heat to air until gas-phase refrigerant discharged from the compressor changes at least to gas-liquid two-phase refrigerant, the refrigerant radiator comprising a plurality of tubes through which the refrigerant flows, the tubes being stacked and arranged in a horizontal direction, and extending in a direction perpendicular to the horizontal direction or with an angle from the horizontal direction, wherein the tubes include a first heat exchange area where refrigerant having a temperature equal to or higher than a standard temperature exchanges heat with first air to be blown to a space, and a second heat exchange area where refrigerant having a temperature lower than the standard temperature exchanges heat with second air to be blown to the space, the second air generally having a temperature different from a temperature of the first air;

a heat exchanging portion including the tubes is configured to radiate heat until gas-phase refrigerant discharged from the compressor changes to liquid-phase refrigerant, and the tubes are inclined with an inclination angle θ between a flow direction of refrigerant flowing in the tubes and the horizontal direction, and are configured to satisfy the following formula, when the inclination angle θ is in a range from 0 to 90 degrees, $$Re \geq A \times X^6 + B \times X^5 + C \times X^4 + D \times X^3 + E \times X^2 + F \times X + G$$

where
$A = -0.0537 \times \theta^2 + 9.7222 \times \theta + 407.19$
$B = -(-0.2093 \times \theta^2 + 37.88 \times \theta + 1586.3)$ $C=-0.3348\times\theta^2+60.592\times\theta+2538.1$
$D=-(-0.2848\times\theta^2+51.53\times\theta+2158.2)$
$E=-0.1402\times\theta^2+25.365\times\theta+1062.8$
$F=-(-0.0418\times\theta^2+7.5557\times\theta+316.46)$
$G=-0.0132\times\theta^2+2.3807\times\theta+99.73$ in which X is a dryness degree of refrigerant at a predetermined position of the tubes where gas-liquid two-phase refrigerant flows, and Re is a Reynolds number at the predetermined position, which is calculated based on an average flow velocity (m/s) of refrigerant flowing in the tubes.

2. A refrigerant radiator used for a vapor compression refrigerant cycle including a compressor configured to compress and discharge refrigerant, and the refrigerant radiator being configured to radiate heat to air until gas-phase refrigerant discharged from the compressor changes at least to gas-liquid two-phase refrigerant, the refrigerant radiator comprising a plurality of tubes through which the refrigerant flows, the tubes being stacked and arranged in a horizontal direction, and extending in a direction perpendicular to the horizontal direction or with an angle from the horizontal direction, wherein the tubes include a first heat exchange area where refrigerant exchanges heat with first air to be blown to a space, and a second heat exchange area where refrigerant exchanges heat with second air to be blown to the space, the second air having a temperature different from a temperature of the first air, the first heat exchange area includes a refrigerant-inlet side of the tubes, the second heat exchange area includes a refrigerant-outlet side of the tubes;

a heat exchanging portion including the tubes is configured to radiate heat until gas-phase refrigerant discharged from the compressor changes to liquid-phase refrigerant, and the tubes are inclined with an inclination angle $\theta$ between a flow direction of refrigerant flowing in the tubes and the horizontal direction, and are configured to satisfy the following formula, when the inclination angle $\theta$ is in a range from 0 to 90 degrees, $$Re \geq A\times X^6+B\times X^5+C\times X^4+D\times X^3+E\times X^2+F\times X+G$$

where
$A=-0.0537\times\theta^2+9.7222\times\theta+407.19$
$B=-(-0.2093\times\theta^2+37.88\times\theta+1586.3)$
$C=-0.3348\times\theta^2+60.592\times\theta+2538.1$
$D=-(-0.2848\times\theta^2+51.53\times\theta+2158.2)$
$E=-0.1402\times\theta^2+25.365\times\theta+1062.8$
$F=-(-0.0418\times\theta^2+7.5557\times\theta+316.46)$
$G=-0.0132\times\theta^2+2.3807\times\theta+99.73$ in which X is a dryness degree of refrigerant at a predetermined position of the tubes where gas-liquid two-phase refrigerant flows, and Re is a Reynolds number at the predetermined position, which is calculated based on an average flow velocity (m/s) of refrigerant flowing in the tubes.

3. The refrigerant radiator according to claim 1, wherein the temperature of the first air is higher than the temperature of the second air.

4. The refrigerant radiator according to claim 1, wherein the tubes include a tube portion in which refrigerant flows downwardly.

5. The refrigerant radiator according to claim 1, further comprising
a header tank extending a stacking direction of the tubes and arranged at least at one side of the tubes in a longitudinal direction of the tubes, to collect and distribute refrigerant.

6. The refrigerant radiator according to claim 5, wherein
an inner space of the header tank is separated into a plurality of spaces,
one of the separated spaces on one side of the header tank includes a refrigerant inlet which introduces refrigerant, and
another one of the separated spaces on the other side of the header tank includes a refrigerant outlet which discharges refrigerant.

7. The refrigerant radiator according to claim 1, wherein the tubes are arranged in multiple layers in an air flow direction.

8. The refrigerant radiator according to claim 1, wherein the tubes includes a first tube group where refrigerant flows from a bottom side upwardly, and a second tube group where refrigerant flows from a top side downwardly.

9. The refrigerant radiator according to claim 1, wherein the tubes are arranged such that refrigerant flows in all the tubes in the same direction.

10. The refrigerant radiator according to claim 1, wherein
the space is an inner space of a vehicle compartment, the first air is air inside of the vehicle compartment, and the second air is air outside of the vehicle compartment, in a case where the refrigerant cycle is used for a vehicle air conditioner.

11. The refrigerant radiator according to claim 2, wherein the temperature of the first air is higher than the temperature of the second air.

12. The refrigerant radiator according to claim 2, wherein the temperature of the first air is lower than the temperature of the second air.

13. The refrigerant radiator according to claim 2, wherein the tubes include a tube portion in which refrigerant flows downwardly.

14. The refrigerant radiator according to claim 2, further comprising
a header tank extending a stacking direction of the tubes and arranged at least at one side of the tubes in a longitudinal direction of the tubes, to collect and distribute refrigerant.

15. The refrigerant radiator according to claim 14, wherein
an inner space of the header tank is separated into a plurality of spaces,
one of the separated spaces on one side of the header tank includes a refrigerant inlet which introduces refrigerant, and
another one of the separated spaces on the other side of the header tank includes a refrigerant outlet which discharges refrigerant.

16. The refrigerant radiator according to claim 2, wherein the tubes are arranged in multiple layers in an air flow direction.

17. The refrigerant radiator according to claim 2, wherein the tubes includes a first tube group where refrigerant flows from a bottom side upwardly, and a second tube group where refrigerant flows from a top side downwardly.

18. The refrigerant radiator according to claim 2, wherein the tubes are arranged such that refrigerant flows in all the tubes in the same direction.

19. The refrigerant radiator according to claim 1, wherein the flow direction of the refrigerant is parallel to the horizontal direction or an upward direction.

20. A vehicle air conditioner comprising the refrigerant radiator according to claim 1, wherein
- the vehicle air conditioner blows the first air and the second air toward a driver seat and a front-passenger seat in a vehicle compartment, and
- the tubes are stacked and arranged in a right-left direction of an instrument panel.

21. The refrigerant radiator according to claim 2, wherein the flow direction of the refrigerant is parallel to the horizontal direction or an upward direction.

22. A vehicle air conditioner comprising the refrigerant radiator according to claim 2, wherein
- the vehicle air conditioner blows the first air and the second air toward a driver seat and a front-passenger seat in a vehicle compartment, and
- the tubes are stacked and arranged in a right-left direction of an instrument panel.

* * * * *